(12) United States Patent
Hong et al.

(10) Patent No.: US 11,978,135 B2
(45) Date of Patent: May 7, 2024

(54) METHOD FOR RECOMMENDING COLOR OF HOME APPLIANCE AND COMPUTER READABLE RECORDING MEDIUM

(71) Applicant: Samsung Electronics Co., Ltd., Suwon-si (KR)

(72) Inventors: Jidam Hong, Suwon-si (KR); Seongjun Kim, Suwon-si (KR); Sohee Kim, Suwon-si (KR); Jieun Kim, Suwon-si (KR); Hyejin Kim, Suwon-si (KR); Jaeyoung Ro, Suwon-si (KR); Soyoung Yun, Suwon-si (KR); Sunhye Lee, Suwon-si (KR); Yejin Jeon, Suwon-si (KR); Kibeom Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 17/692,941

(22) Filed: Mar. 11, 2022

(65) Prior Publication Data
US 2022/0292735 A1 Sep. 15, 2022

Related U.S. Application Data

(63) Continuation of application No. PCT/KR2022/003400, filed on Mar. 10, 2022.

(30) Foreign Application Priority Data

Mar. 12, 2021 (KR) .................. 10-2021-0032982
Jun. 22, 2021 (KR) .................. 10-2021-0081159

(51) Int. Cl.
*G06T 11/00* (2006.01)
*G06Q 30/0601* (2023.01)

(52) U.S. Cl.
CPC ........ *G06T 11/001* (2013.01); *G06Q 30/0631* (2013.01); *G06Q 30/0641* (2013.01); *G06T 2200/24* (2013.01)

(58) Field of Classification Search
CPC .............. G06T 11/001; G06T 2200/24; G06T 2207/10024; G06F 3/04842; G06F 3/0484;
(Continued)

(56) References Cited

U.S. PATENT DOCUMENTS 8,089,482 B1 1/2012 Axelrod
9,412,086 B2 8/2016 Morse et al.
(Continued)

FOREIGN PATENT DOCUMENTS

JP 2017-194266 A 10/2017
KR 10-2002-0014557 A 2/2002
(Continued)

OTHER PUBLICATIONS

Naver Blog, Samsung Bespoke Kimchi Refrigerator 4 Door Color Deciding, Nov. 25, 2020, <Online>, <Search Date: Jun. 13, 2022>, <Source URL: https://blog.naver.com/yikim107/222154496779> Full literature reference.
(Continued)

*Primary Examiner* — Hau H Nguyen
(74) *Attorney, Agent, or Firm* — Jefferson IP Law, LLP

(57) ABSTRACT

A method for recommending a color of a home appliance is provided. The method includes providing a plurality of panel graphic objects corresponding to each of a plurality of panels of the home appliance, providing a plurality of color graphic objects each representing a plurality of colors, receiving a selection for one of the plurality of color graphic objects, applying a color represented by the selected color graphic object to one of the plurality of panel graphic
(Continued)

objects, and providing information on a color scheme corresponding to the color represented by the selected color graphic object.

18 Claims, 28 Drawing Sheets

(58) Field of Classification Search
CPC .... G06F 3/01; G06F 16/5838; G06F 3/04817; G09G 2354/00; G09G 3/035; G09G 5/02; G09G 3/3426
See application file for complete search history.

(56) References Cited

U.S. PATENT DOCUMENTS

| | | | |
|---|---|---|---|
| 2010/0194776 A1 | 8/2010 | Chong et al. | |
| 2014/0253610 A1* | 9/2014 | Alman | H04N 1/6011 345/690 |
| 2015/0379959 A1 | 12/2015 | Dorner et al. | |
| 2017/0098314 A1* | 4/2017 | Sayre, III | G06Q 30/0623 |
| 2022/0130324 A1* | 4/2022 | Lim | G09G 3/035 |

FOREIGN PATENT DOCUMENTS

| | | |
|---|---|---|
| KR | 10-2003-0011457 A | 2/2003 |
| KR | 10-0763403 B1 | 10/2007 |
| KR | 10-2008-0076594 A | 8/2008 |
| KR | 10-0854007 B1 | 8/2008 |
| KR | 10-1713333 B1 | 3/2017 |
| KR | 10-2018-0040865 A | 4/2018 |
| KR | 10-2019-0098719 A | 8/2019 |
| KR | 10-2178767 B1 | 11/2020 |
| KR | 10-2021-0022945 A | 3/2021 |

OTHER PUBLICATIONS

News 1 news, 360 colors make 'my own refrigerator'... Samsung Bespoke 'Prism 360 Color', Mar. 9, 2021, <Online>, <Search date: Jun. 13, 2022>, <Source URL: https://www.news1.kr/articles/?4234989> Full literature reference.
International Search Report dated Jun. 29, 2022, issued in International Patent Application No. PCT/KR2022/003400.
Extended European Search Report dated Nov. 3, 2023, issued in European Patent Application No. 22767545.1.

* cited by examiner

METHOD FOR RECOMMENDING COLOR OF HOME APPLIANCE AND COMPUTER READABLE RECORDING MEDIUM

CROSS-REFERENCE TO RELATED APPLICATION(S)

This application is a continuation application, claiming priority under § 365(c), of an International application No. PCT/KR2022/003400, filed on Mar. 10, 2022, which is based on and claims the benefit of a Korean patent application number 10-2021-0032982, filed on Mar. 12, 2021, in the Korean Intellectual Property Office, and of a Korean patent application number 10-2021-0081159, filed on Jun. 22, 2021, in the Korean Intellectual Property Office, the disclosure of each of which is incorporated by reference herein in its entirety.

BACKGROUND

1. Field

The disclosure relates to a method for recommending a color of a home appliance. More particularly, the disclosure relates to a computer-readable recording medium in which a program for performing the method is recorded.

2. Description of Related Art

In general, home appliances such as a refrigerator, a clothes care apparatus, a dishwasher, and a cooking appliance include a main body accommodating an object to be treated and a door opening and closing the main body.

Regardless of the use of the home appliances, the most visible parts to users are doors and other exterior panels. Accordingly, if the color of the panel is implemented by reflecting the user's taste, it is expected that the aesthetic satisfaction of the user may be improved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for recommending a color of a home appliance capable of guiding a consumer's selection in a case where a color of a panel of a home appliance may be implemented in various ways, and a computer-readable recording medium in which a program for performing the method is recorded.

Another aspect of the disclosure is to provide, in a case where a home appliance includes a plurality of panels, a method for recommending a color of a home appliance capable of recommending colors that are harmonized with each other for each of the plurality of panels, and a computer-readable recording medium in which a program for performing the method is recorded.

Additional aspects of the disclosure will be set forth in part in the description which follows and, in part, will be apparent from the description, or may be learned by practice of the presented embodiments.

In accordance with an aspect of the disclosure, a method for recommending a color of a home appliance is provided. The method includes providing a plurality of panel graphic objects corresponding to each of a plurality of panels of the home appliance, providing a plurality of color graphic objects each representing a plurality of colors, receiving a selection for one of the plurality of color graphic objects, applying a color represented by the selected color graphic object to one of the plurality of panel graphic objects, and providing information on a color scheme corresponding to the color represented by the selected color graphic object.

The method may further include pre-storing a color scheme corresponding to each of the plurality of colors.

The provision of the information on the color scheme may include obtaining a color scheme corresponding to the color represented by the selected color graphic object, according to a predetermined color scheme algorithm.

The method may further include providing a plurality of color group graphic objects each representing a plurality of color groups, and receiving a selection for one of the plurality of color group graphic objects, and the plurality of color graphic objects each may represent a plurality of colors included in the selected color group.

The provision of the information on the color scheme may include providing a plurality of color scheme graphic objects each representing a plurality of colors forming the color scheme.

The plurality of panel graphic objects and the plurality of color graphic objects may be provided on a single screen.

The plurality of color group graphic objects, the plurality of color graphic objects, and the plurality of color scheme graphic objects may be displayed in order along one direction.

The provision of the information on the color scheme may include, in response to a color being respectively applied to two or more panel graphic objects among the plurality of panel graphic objects, providing information on a color scheme corresponding to the last applied color among the applied colors.

The provision of the information on the color scheme may include, in response to a color being respectively applied to two or more panel graphic objects among the plurality of panel graphic objects, providing information on a color scheme corresponding to a color, which is applied to a panel graphic object closest to a panel graphic object which is a color selection target, among the applied colors.

The provision of the information on the color scheme may include providing information on the color scheme differently according to at least one of a location and a size of a panel, which is a color selection target, among the plurality of panels.

The method may further include, in response to completion of selection of a color for each of the plurality of panels, storing information on the color selected for each of the plurality of panels in an electronic device or a server.

The method may further include, in response to completion of selection of a color for each of the plurality of panels, providing a user interface for purchasing a home appliance including a plurality of panels of the selected color.

In accordance with another aspect of the disclosure, a computer-readable recording medium is provided. The computer-readable recording medium includes a program configured to perform the above-mentioned method for recommending the color of the home appliance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings of which.

The same reference numerals are used to represent the same elements throughout the drawings.

DETAILED DESCRIPTION

Figure 1:
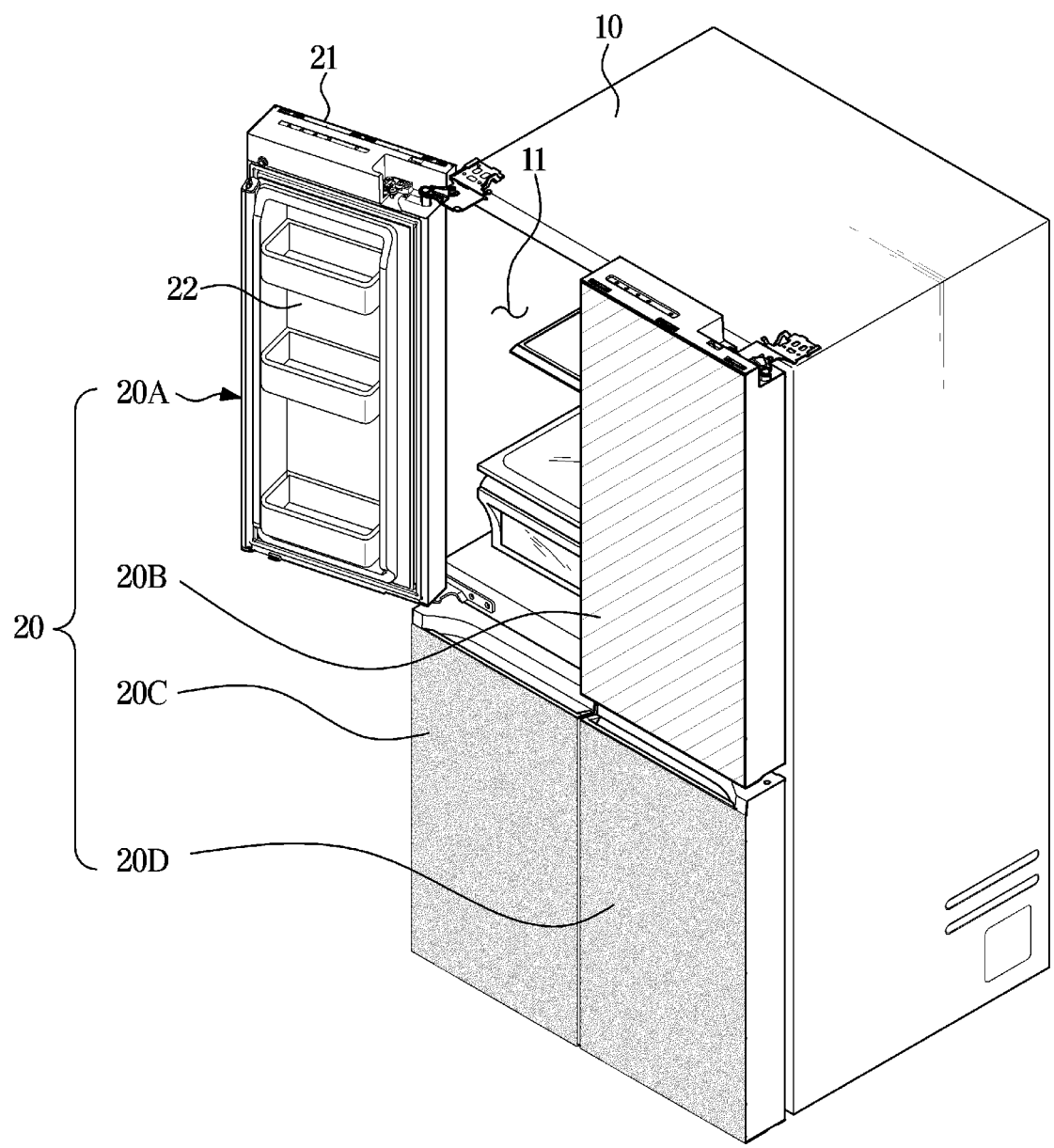
FIG. 1 is an external view illustrating an example of a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

An identification code is used for the convenience of the description but is not intended to illustrate the order of each step. Each step may be implemented in the order different from the illustrated order unless the context clearly indicates otherwise.

Hereinafter, a method for recommending a color of a home appliance, a computer-readable recording medium in which a program for performing the method is recorded, and an electronic device configured to perform the method will be described in detail with reference to the accompanying drawings.

The method for recommending the color of the home appliance according to an embodiment may recommend a color for at least one of various home appliances such as a refrigerator, a clothes care apparatus, a dishwasher, an air purifier, an induction cooker, and an oven.

In addition, a color recommended by the method for recommending the color of the home appliance according to an embodiment may include a color of a panel forming an exterior of the home appliance. The panel forming the exterior of the home appliance may be a panel forming a main body or a panel forming a door provided in the main body. Hereinafter a refrigerator will be described as an example.

Figure 2:
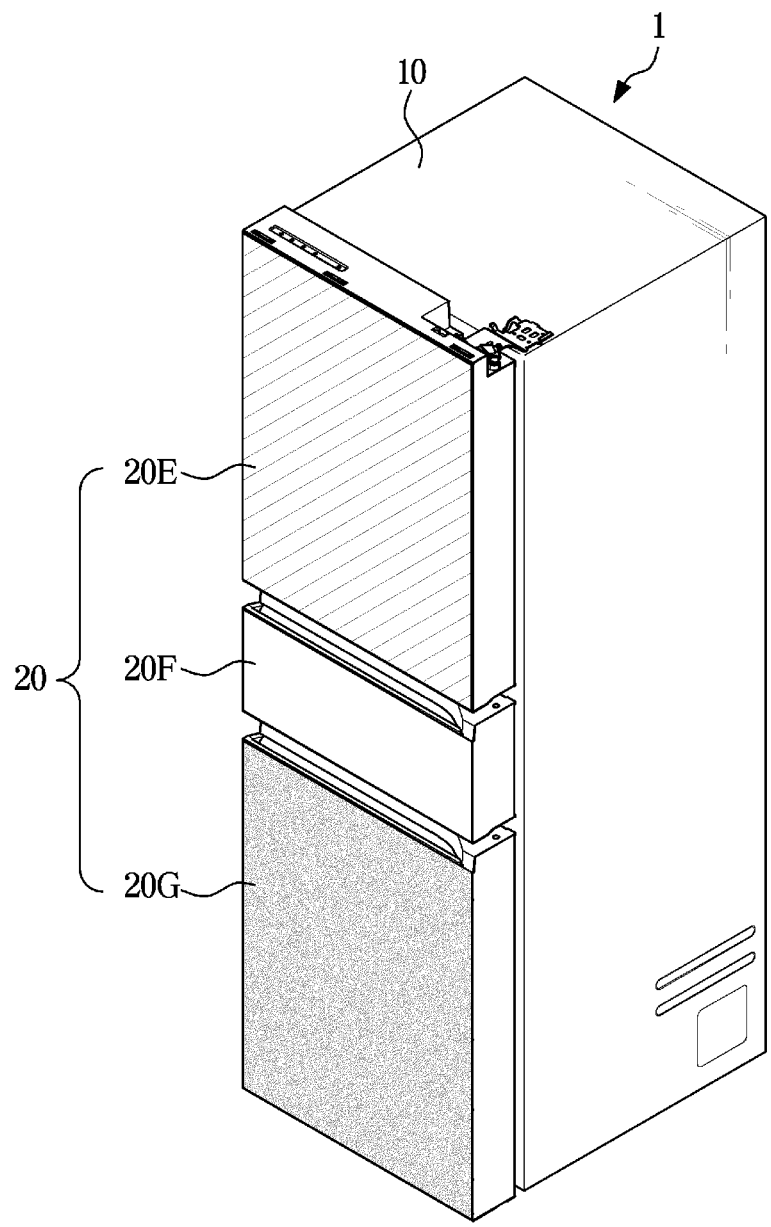
FIG. 2 is an external view illustrating an example of a refrigerator according to an embodiment of the disclosure.
Figure 3:
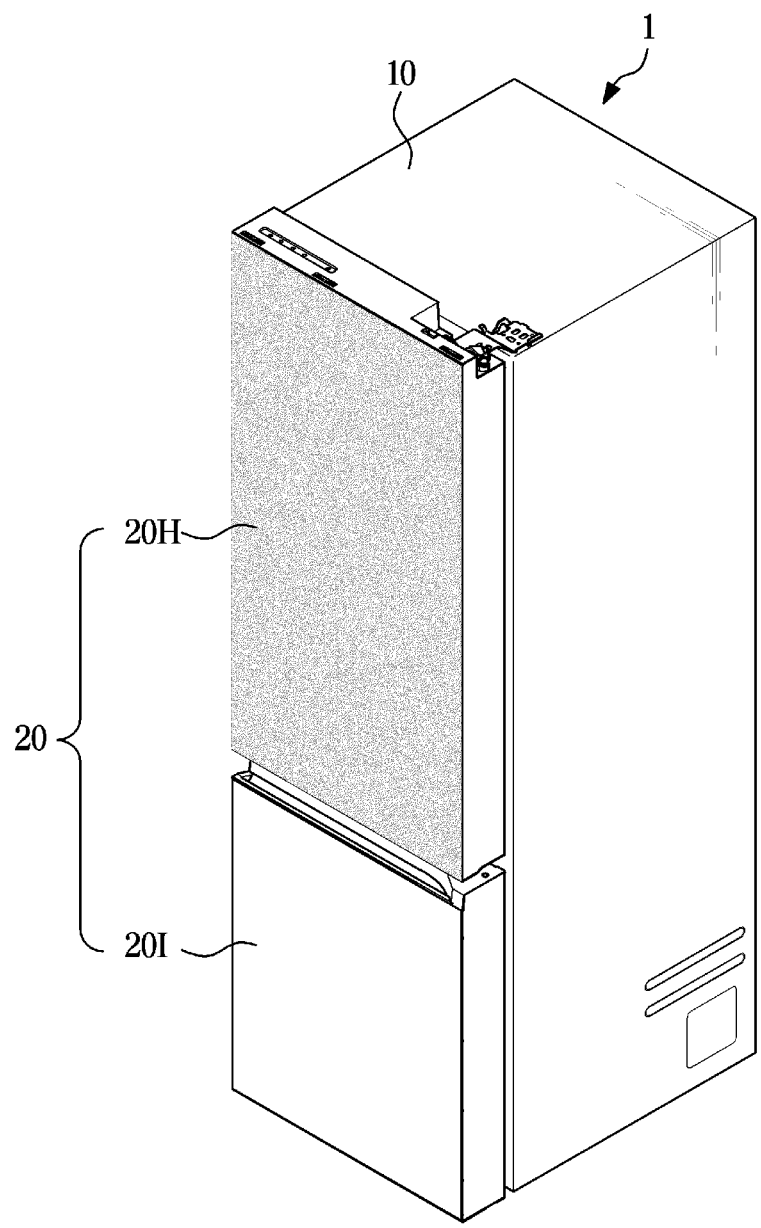
FIG. 3 is an external view illustrating an example of a refrigerator according to an embodiment of the disclosure.

FIGS. 1 to 3 are external views illustrating an example of a refrigerator according to various embodiments of the disclosure.

Referring to FIG. 1, a refrigerator 1 is a home appliance configured to keep food fresh by including a main body 10 provided with a storage compartment 11 provided to store food, and a cold air supply device configured to supply cold air to the storage compartment 11.

At least one surface of the storage compartment 11 provided in the main body 10 may be opened for putting and withdrawing food, and the openable side may be opened and closed by a door 20.

The door 20 may include a door panel 21 and a door body 22. The door panel 21 may be removably coupled to the door body 22. However, because the disclosed embodiment is not limited thereto, the door panel 21 and the door body 22 may be integrally formed with each other.

The door panel 21 may be provided on a front surface of the door 20, and the door body 22 may be provided on a rear surface of the door 20, that is facing the inside of the main body 10. The front surface of the door 20 refers to a surface that is shown to a user in a closed state of the door 20, and the rear surface of the door 20 refers to a surface that faces the storage compartment 11 in the closed state of the door 20.

Various parts provided to seal the storage compartment 11 inside the main body 10 from the outside environment, such as a chassis, a door cap, a cover, and a case, may be provided on the door body 22 provided on the rear surface of the door 20.

The refrigerator 1 may include a plurality of doors 20. According to an example of FIG. 1, the refrigerator 1 may include total of four doors 20A, 20B, 20C, and 20D including two doors 20A, and 20B configured to open and close an upper storage compartment and two doors 20C, and 20D configured to open and close a lower storage compartment.

Referring to FIG. 2, the refrigerator 1 may include a total of three doors 20E, 20F and 20G, or referring to FIG. 3, the refrigerator 1 may include a total of two doors 20H and 20I.

That is, the refrigerator 1 may include various combinations of doors 20, and a consumer may select a desired combination among various combinations of doors 20.

In addition, the door 20 may have various colors, and when the refrigerator 1 includes the plurality of doors 20, each of the plurality of doors 20 may have a different color. The color of the door 20 may mean a color of the door panel 21 shown to the consumer in the closed state of the door 20.

In the above description, the refrigerator 1 is illustrated as an example, but other home appliances other than the refrigerator 1 may include a plurality of panels, and the plurality of panels may have different colors.

Accordingly, it is possible to combinate various color for a plurality of panels even for the same home appliance. Because there are various possible color schemes, it is not easy to provide actual home appliances for each color scheme in a store or it is not easy to pre-store and provide images of all color schemes on a web page.

The method for recommending the color for the home appliance according to an embodiment may provide a user interface to allow a consumer to simulate a color scheme by applying a desired color to each of a plurality of panels of the home appliance.

In addition, as the number of selectable colors increases, it may be difficult for a consumer to determine a color scheme. The method for recommending the color of the home appliance according to an embodiment may recommend a harmonious color scheme for a plurality of panels so as to guide a consumer's selection.

Figure 4:
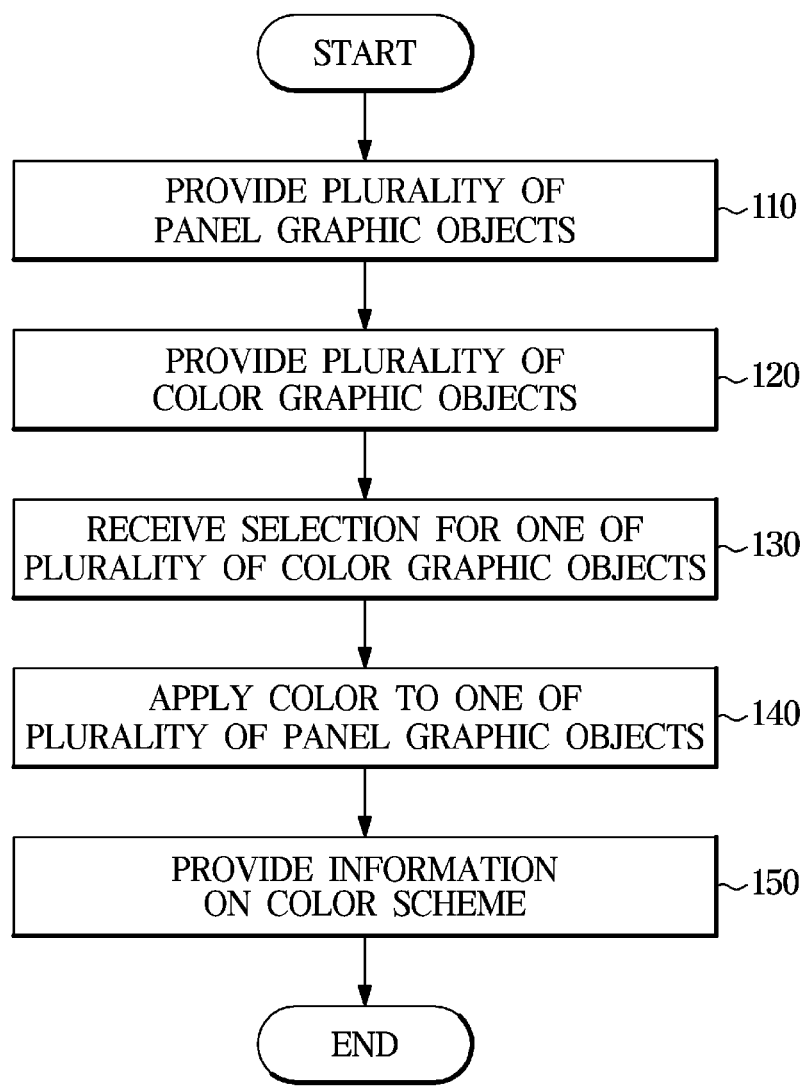
FIG. 4 is a flowchart of a method for recommending a color of a home appliance according to an embodiment of the disclosure.

FIG. 4 is a flowchart of a method for recommending a color of a home appliance according to an embodiment of the disclosure.

Referring to FIG. 4, the method for recommending the color of the home appliance according to an embodiment includes providing a plurality of panel graphic objects each corresponding to the plurality of panels included in the home appliance (110), providing a plurality of color graphic objects representing a plurality of colors (120), receiving a selection for one of the plurality of color graphic objects (130), applying a color represented by the selected color graphic object to one of the plurality of panel graphic objects (140) and providing information on a color scheme corresponding to the color represented by the selected color graphic object (150).

As described above, the panel of the home appliance may be a panel provided to form the exterior of the home appliance, and for example, the panel may be a door panel. In an embodiment to be described below, a method of recommending a color of a door of a refrigerator will be described as an example, for a detailed description.

Figure 5:
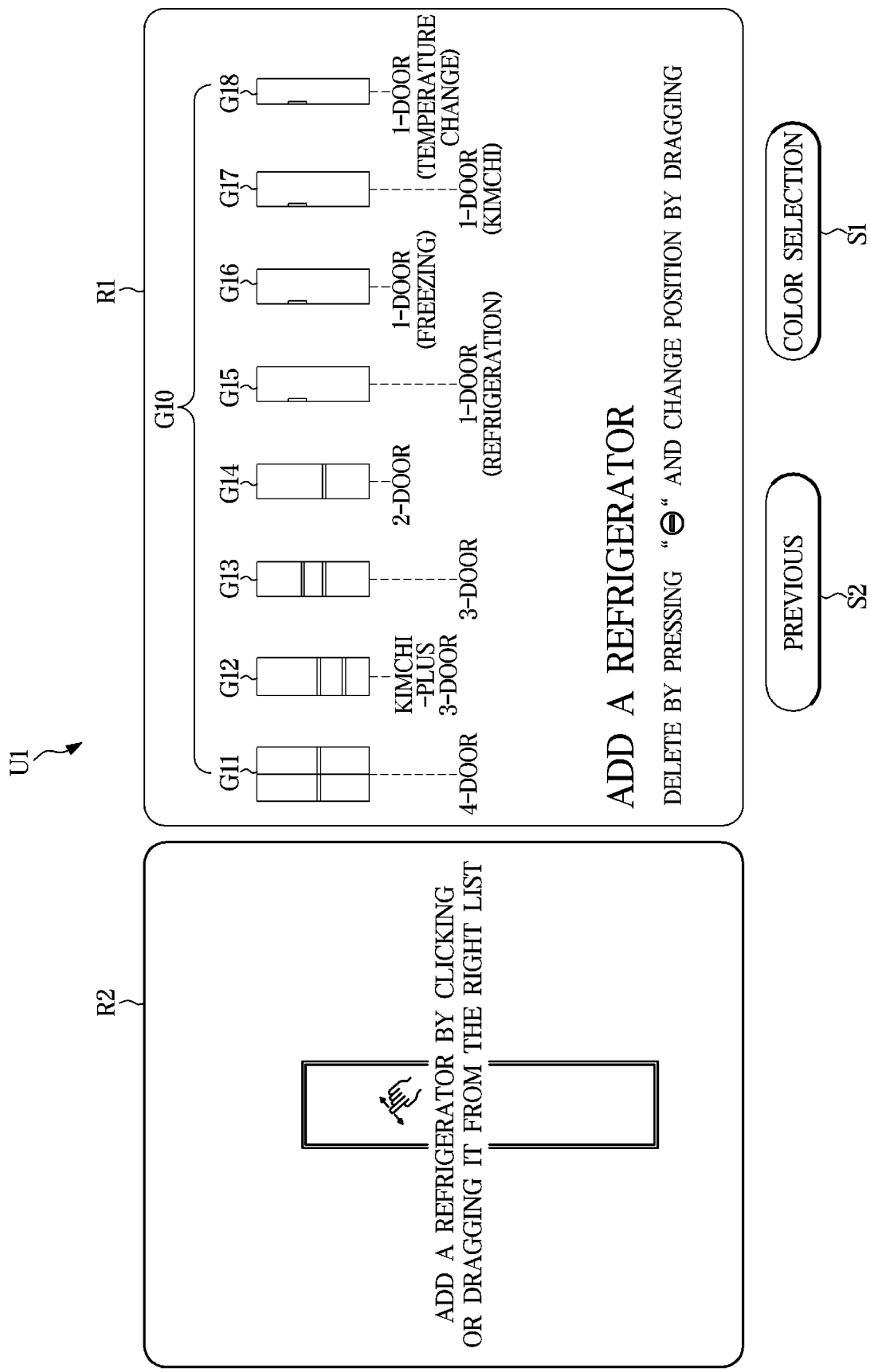
FIG. 5 is a view illustrating examples of a user interface for guiding and receiving a selection of a panel combination of a home appliance in a method for recommending a color of the home appliance according to an embodiment of the disclosure.
Figure 6:
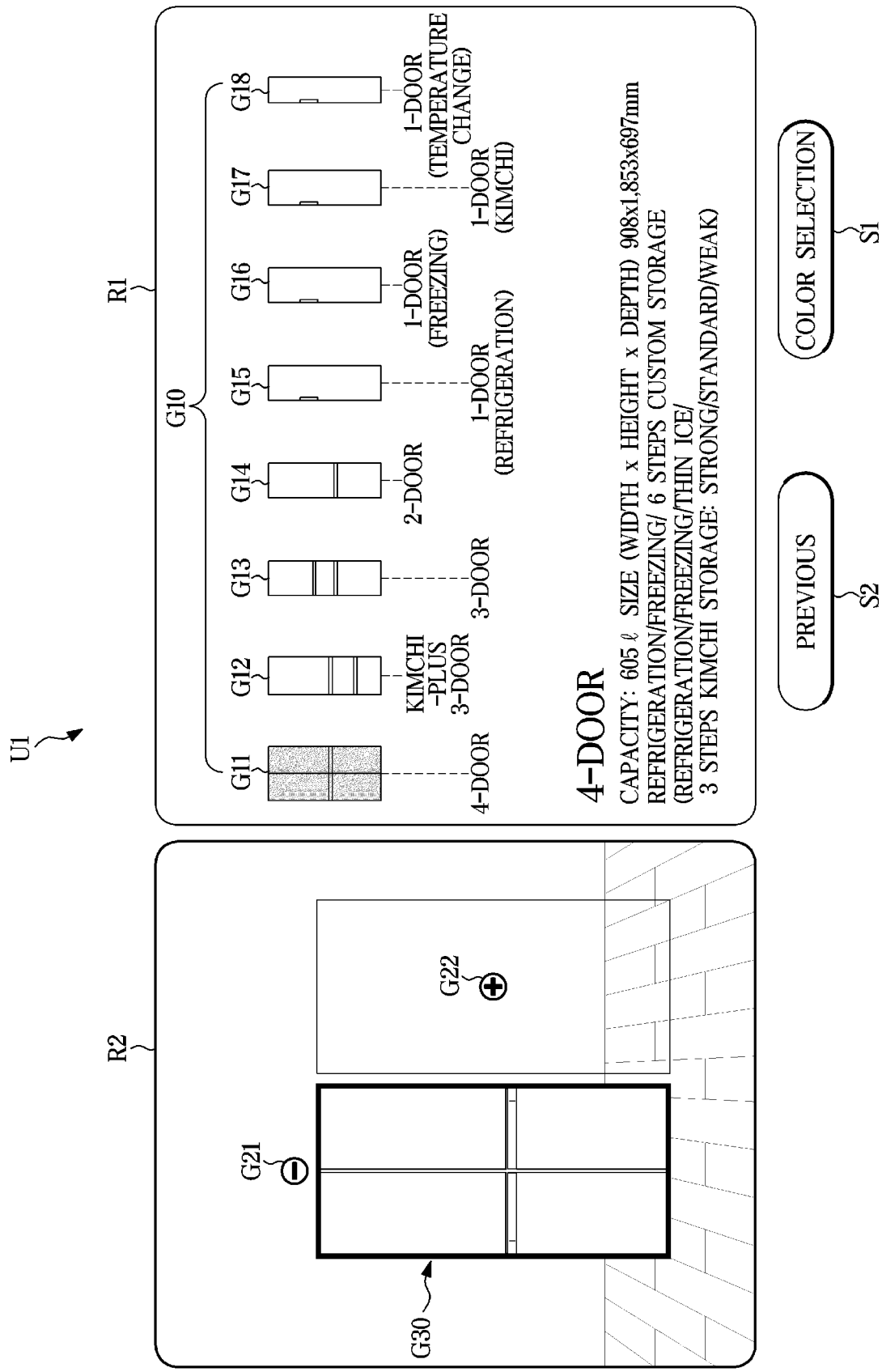
FIG. 6 is a view illustrating examples of a user interface for guiding and receiving a selection of a panel combination of a home appliance in a method for recommending a color of the home appliance according to an embodiment of the disclosure.

FIGS. 5 and 6 are views illustrating examples of a user interface for guiding and receiving a selection of a panel combination of a home appliance in a method for recommending a color of a home appliance according to various embodiments of the disclosure.

The user interface provided in the embodiment means a graphical user interface. In addition, the graphical user interface or graphical object provided in the embodiment may be used to provide information to a user or to receive a user's selection.

When the home appliance that the user wants to purchase is a refrigerator, the user may select a door combination of the refrigerator before selecting a color of the refrigerator. For this, the method for recommending the color of the home appliance according to an embodiment may provide a panel selection user interface U1 for guiding the selection of the door combination of the refrigerator, as shown in FIG. 5.

In an embodiment to be described later, a user means a consumer to whom a color of a home appliance is recommended.

Referring to FIG. 5, a door combination graphic object G10 representing various door combinations of the refrigerator may be displayed in a first region R1 of the panel selection user interface U1. The method for recommending the color of the home appliance according to an embodiment may receive a user's selection for one of various door combinations through the door combination graphic object G10.

For example, a graphic object G11 representing four doors, graphic objects G12 and G13 representing three doors, a graphic object G14 representing two doors, and a graphic object representing one door G15 to G18 may be displayed on the door combination graphic object G10.

In addition, even if the door combination is the same, the use of the refrigerator may be different. Even in this case, the door combinations may be displayed by different graphic objects G12 and G13 or G15 to G18.

The user may select a door combination of the refrigerator by selecting one of the plurality of door combination graphic objects G11 to G18 displayed in the first region R. For example, the user clicks one of the door combination graphic objects G11 to G18 or drags one of the door combination graphic objects G11 to G18 and drops the one door combination to a second region R2, thereby selecting the door combination of the refrigerator.

Referring to FIG. 6, in response to selecting the one of the door combination graphic objects G11 to G18, a simulation graphic object G30 corresponding to the selected door combination may be displayed in the second region R2. The simulation graphic object G30 may represent a shape of the refrigerator having the selected door combination.

In addition, a delete button G21 and an add button G22 may be displayed in the second region R2 together with the simulation graphic object G30 representing the shape of the refrigerator. In response to selecting the delete button G21, the displayed simulation graphic object G30 may be deleted. That is, the selection of the door combination of the refrigerator may be canceled.

In response to selecting the add button G22 and in response to selecting one of the door combination graphic objects G11 to G18 displayed in the first region R1, a simulation graphic object corresponding to the additionally selected door combination graphic object may be additionally displayed in the second region R2.

In response to the completion of the selection of the desired door combination, the user may select a color selection button S1. In response to selecting the color selection button S1, it may proceed to a step of selecting a color for the selected door combination.

Alternatively, it is also possible for the user to return to the previous step of selecting the door combination by selecting the previous button S2.

Figure 7:
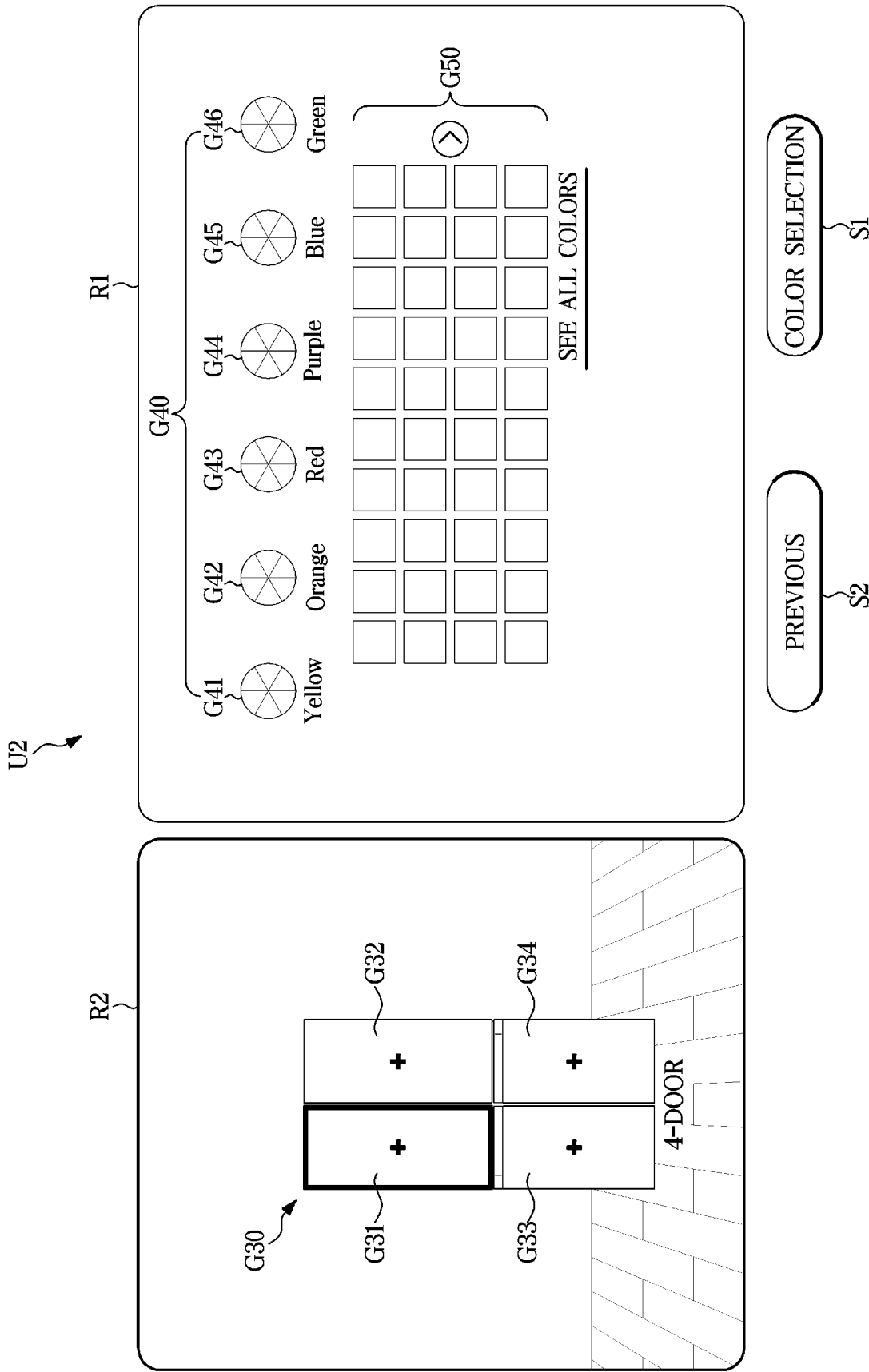
FIG. 7 is a view illustrating an example of a user interface for receiving a color selection for a selected panel combination and recommending a color in a method for recommending a color of a home appliance according to an embodiment of the disclosure.
Figure 8:
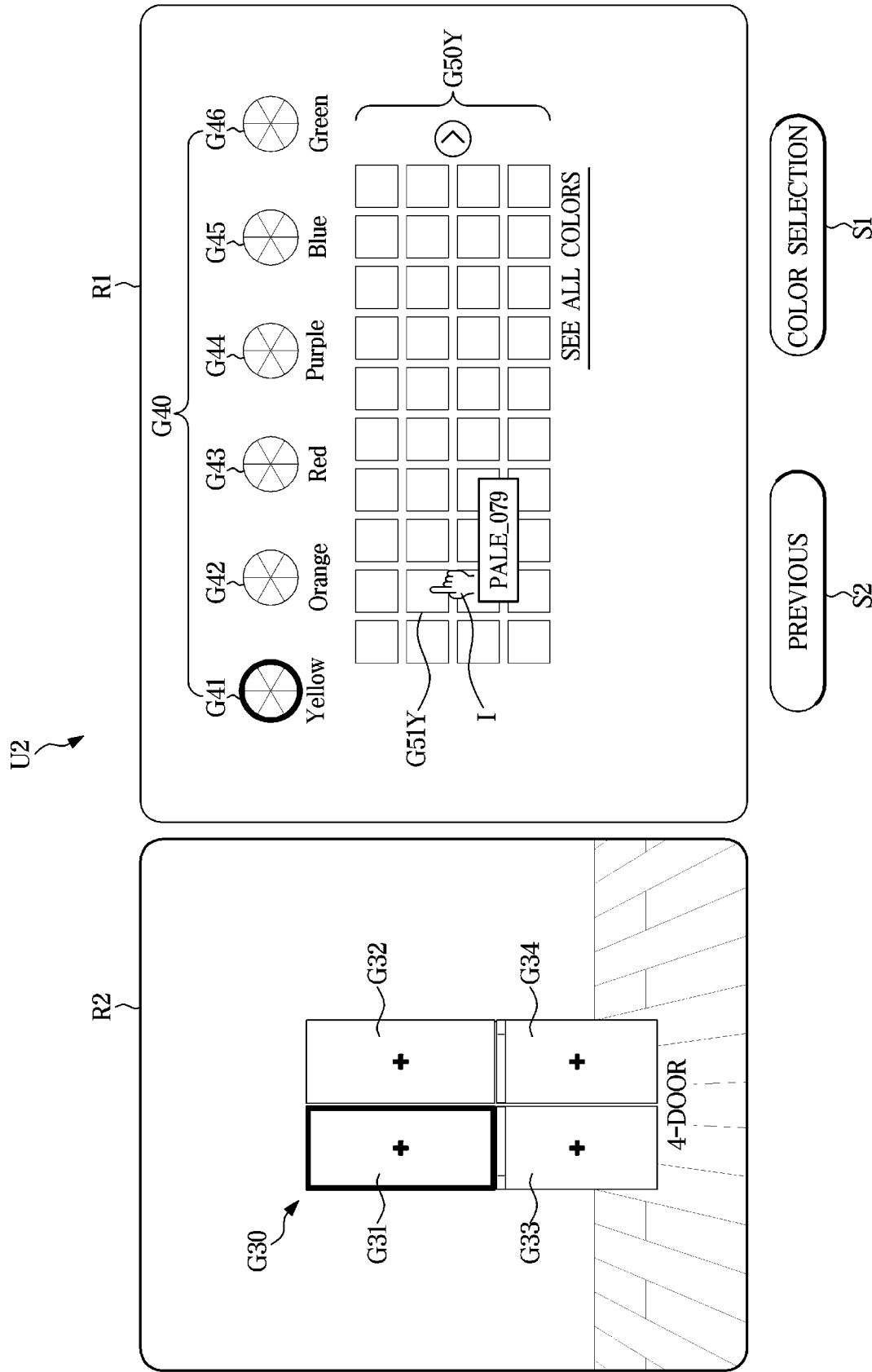
FIG. 8 is a view illustrating an example of a user interface for receiving a color selection for a selected panel combination and recommending a color in a method for recommending the color of a home appliance according to an embodiment of the disclosure.
Figure 9:
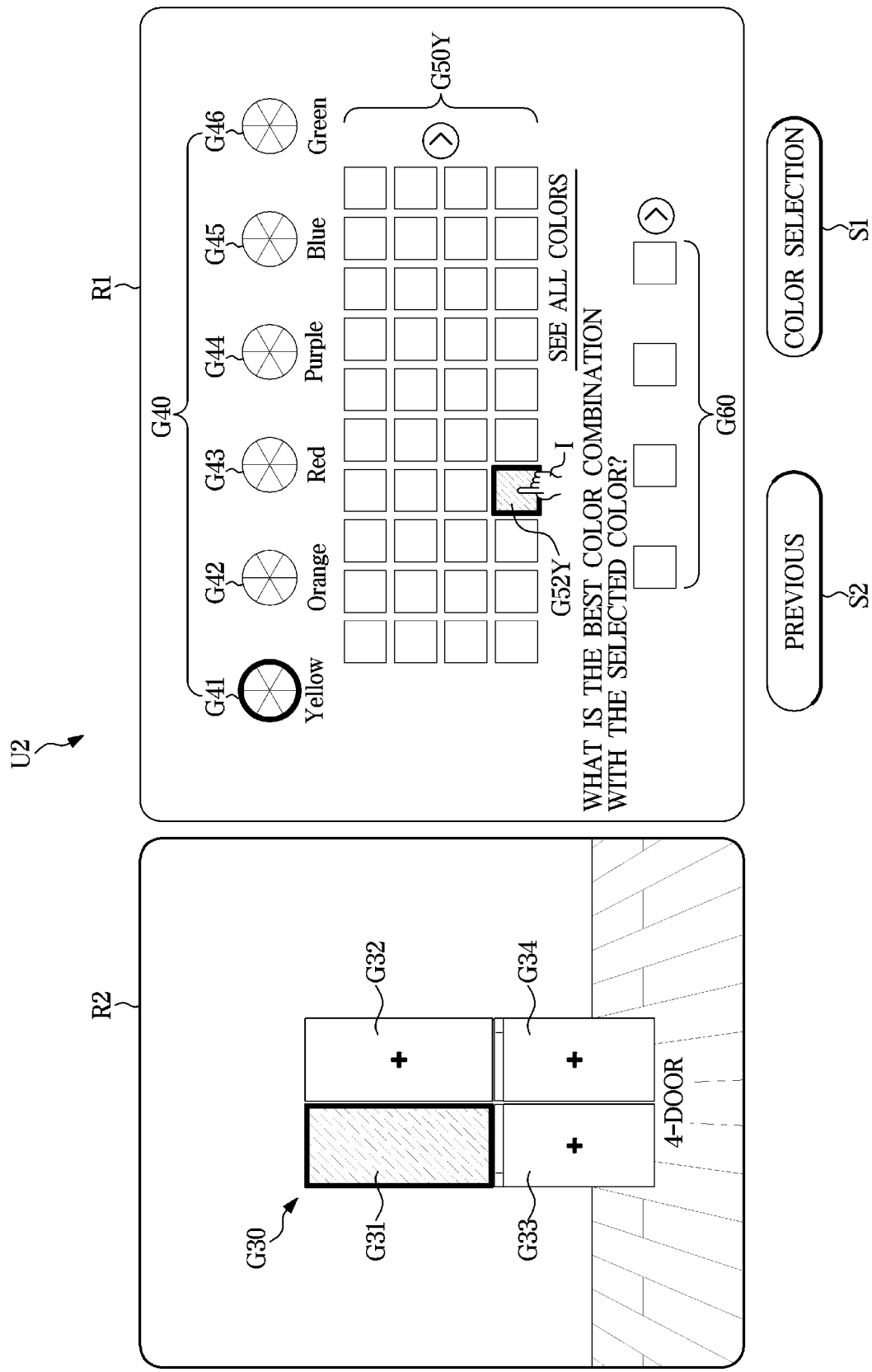
FIG. 9 is a view illustrating an example of a user interface for receiving a color selection for a selected panel combination and recommending a color in a method for recommending the color of a home appliance according to an embodiment of the disclosure.

FIGS. 7 to 9 are views illustrating an example of a user interface for receiving a color selection for a selected panel combination and recommending a color in a method for recommending a color of a home appliance according to various embodiments of the disclosure.

The method for recommending the color of the home appliance according to an embodiment may provide a color recommendation user interface configured to recommend a color for each of the plurality of panels forming the selected panel combination.

Referring to FIG. 7, various graphic objects G40 and G50 for guiding color selection may be displayed in a first region R1 of the color recommendation user interface U2, and a simulation graphic object G30 corresponding to the door combination selected in the previous step may be displayed in a second region R2.

As described above, the simulation graphic object G30 may represent the shape of the refrigerator including the selected door combination. For example, in response to selecting the door combination including four doors, the simulation graphic object G30 representing the shape of the refrigerator including four doors may be displayed as shown in FIG. 7.

The simulation graphic object G30 may include a first door graphic object G31, a second door graphic object G32, a third door graphic object G33, and a fourth door graphic object G34, which correspond to each of the four doors.

In response to selecting one of the first door graphic object G31, the second door graphic object G32, the third door graphic object G33, and the fourth door graphic object G34, by the user, and selecting a color through the graphic objects G40 and G50 displayed on the first region R1, by the user, the selected color may be applied to the selected door graphic object.

Various colors applicable to the refrigerator may be classified into a plurality of color groups. A color group graphic object G40 representing the plurality of color groups may be displayed on the first region R1 of the color recommendation user interface U2.

The plurality of color groups may be classified according to a criterion for classifying a base color. For example, the base color may include two or more colors among colors arranged along a color wheel or a color circle of a color system employed by the method according to an embodiment.

For example, the plurality of color groups may include a yellow group, an orange group, a red group, a purple group, a blue group, and a green group. In this case, yellow may become the base color of the yellow group, orange may become the base color of the orange group, red may become the base color of the red group, purple may become the base color of the purple group, and blue may become the base color of the blue group, and green may become the base color of the green group.

Alternatively, the plurality of color groups may further include a yellow-orange group, an orange-red group, a red-purple group, a purple-blue group, a blue-green group, and a green-yellow group.

The criterion for classifying the plurality of color groups is not limited to the above-described example. Accordingly, it is possible to classify the plurality of color groups according to other criteria, but in an embodiment to be described later, a case in which the plurality of color groups includes a yellow group, an orange group, a red group, a purple group, a blue group, and a green group according to the above-described example will be described as an example.

The color group graphic object G40 may include a yellow group graphic object G41 corresponding to the yellow group, an orange group graphic object G42 corresponding to the orange group, a red group graphic object G43 corresponding to the red group, a purple group graphic object G44 corresponding to the purple group, a blue group graphic object G45 corresponding to the blue group, and a green group graphic object G46 corresponding to the green group.

Each of the plurality of color groups may include a plurality of colors included in the corresponding group, and the plurality of colors included in the same group may have the same base color.

Particularly, the yellow group may include a plurality of colors having yellow as the base color, the orange group may include a plurality of colors having orange as the base color, and the red group may include a plurality of colors having red as the base color, the purple group may include a plurality of colors having purple as the base color, the blue group may include a plurality of colors having blue as the base color, and the green group may include a plurality of colors having green as the base color.

The user may select one of the plurality of color groups by selecting one of the color group graphic objects G40. In response to selecting one of the plurality of color groups, a color graphic object G50 representing the plurality of colors included in the selected color group may be displayed in the first region R1 of the color recommendation user interface U2.

Referring to FIG. 8, in response to selecting the yellow group graphic object G41, a color graphic object G50Y representing a plurality of colors included in the yellow group may be displayed on the first region R1 of the color recommendation user interface U2.

The color graphic object G50Y may be composed of a plurality of color graphic objects each representing a plurality of colors. The user may select a desired color by checking a color represented by each of the plurality of color graphic objects, and by selecting a color graphic object representing the desired color.

Additionally, it is also possible to display the color name of the color represented by the plurality of color graphic objects to guide the user's color selection. For example, as shown in FIG. 8, in response to positioning an indicator I on one G51Y of the plurality of color graphic objects by the user, the color name PALE_079 of the corresponding color may be displayed.

Referring to FIG. 9, one of the plurality of colors may be selected through one G52Y of the plurality of color graphic objects. In response to selecting a color, the selected color may be applied to the selected door graphic object G31 among the plurality of door graphic objects G31, G32, G33, and G34 displayed on the second region R2.

In response to selecting a color for one of the plurality of doors, information on a color scheme corresponding to the selected color may be displayed in the first region R1 of the color recommendation user interface U2.

For example, as shown in FIG. 9, a color scheme graphic object G60 representing a color scheme corresponding to the selected color may be displayed on the first region R1 of the color recommendation user interface U2.

Meanwhile, the color group graphic object G10, the color graphic object G50 representing the plurality of colors included in the selected color group, and the color scheme graphic object G60 representing the color scheme corresponding to the selected color may be displayed on a single screen.

In addition, the method for recommending the color of the home appliance according to an embodiment of the disclosure may display the color group graphic object G10, the color graphic object G50, and the color scheme graphic object G60 in order along one direction so as to allow the user to intuitively check and select colors according to the flow of selection.

The graphic objects G10, G50, and G60 are displayed along a vertical direction according to the example, but it is also possible to display the graphic objects along the left and right directions.

The color scheme corresponding to the selected color may mean a color that matches well with the selected color, that is, a color that is harmonized with the selected color. The method for recommending the color of the home appliance according to an embodiment of the disclosure may recommend a color according to a color scheme algorithm for determining a color scheme that is harmonious with each other. Hereinafter, a color scheme algorithm used by the method for recommending the color of the home appliance according to an embodiment of the disclosure will be described in detail.

The method for recommending the color of the home appliance according to an embodiment of the disclosure may employ a natural color system (NCS) among various color systems.

Figure 10:
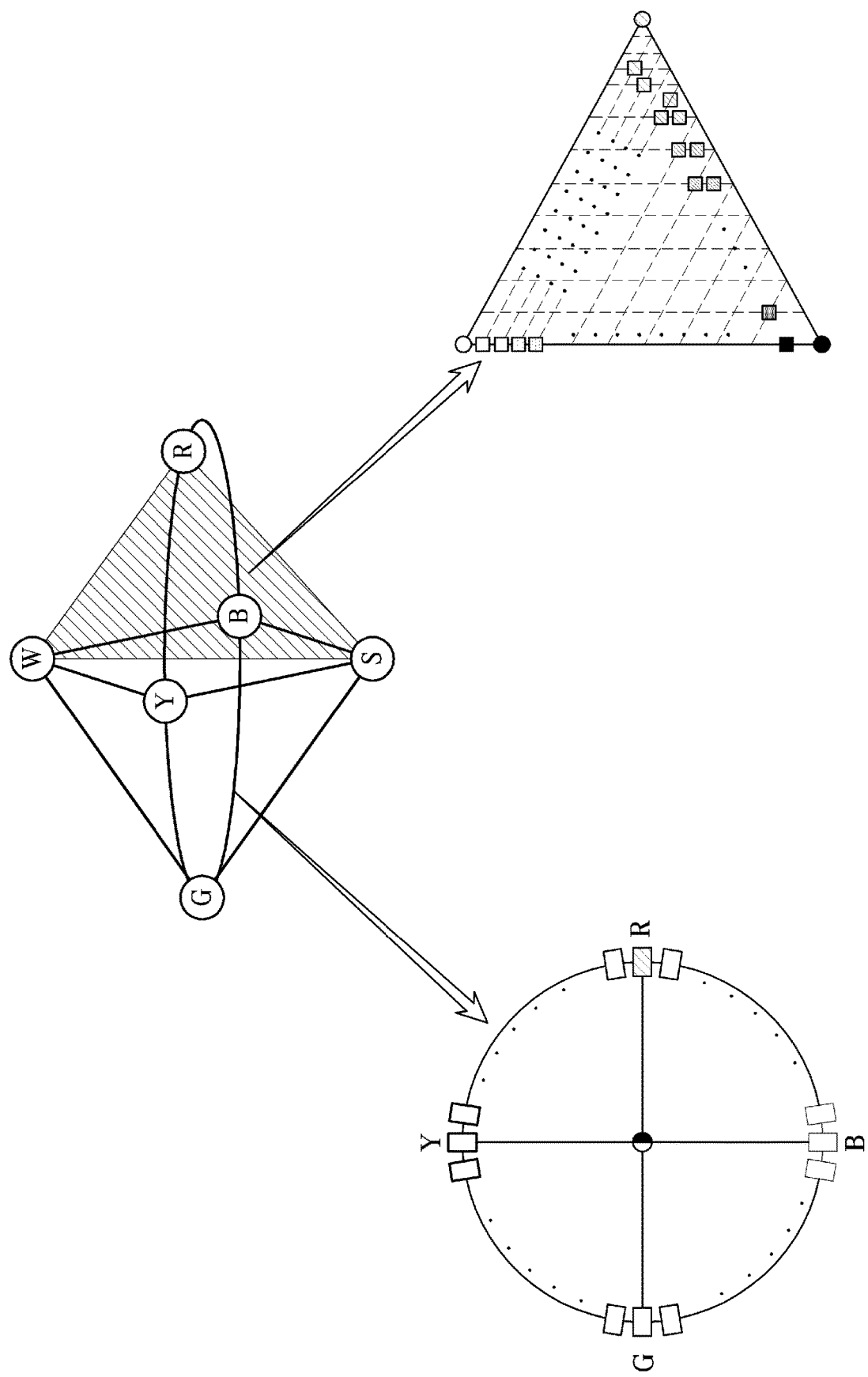
FIG. 10 is a view illustrating a color space of a natural color system employed by a method for recommending a color of a home appliance according to an embodiment of the disclosure.

FIG. 10 is a view illustrating a color space of a natural color system employed by a method for recommending a color of a home appliance according to an embodiment of the disclosure.

Figure 11:
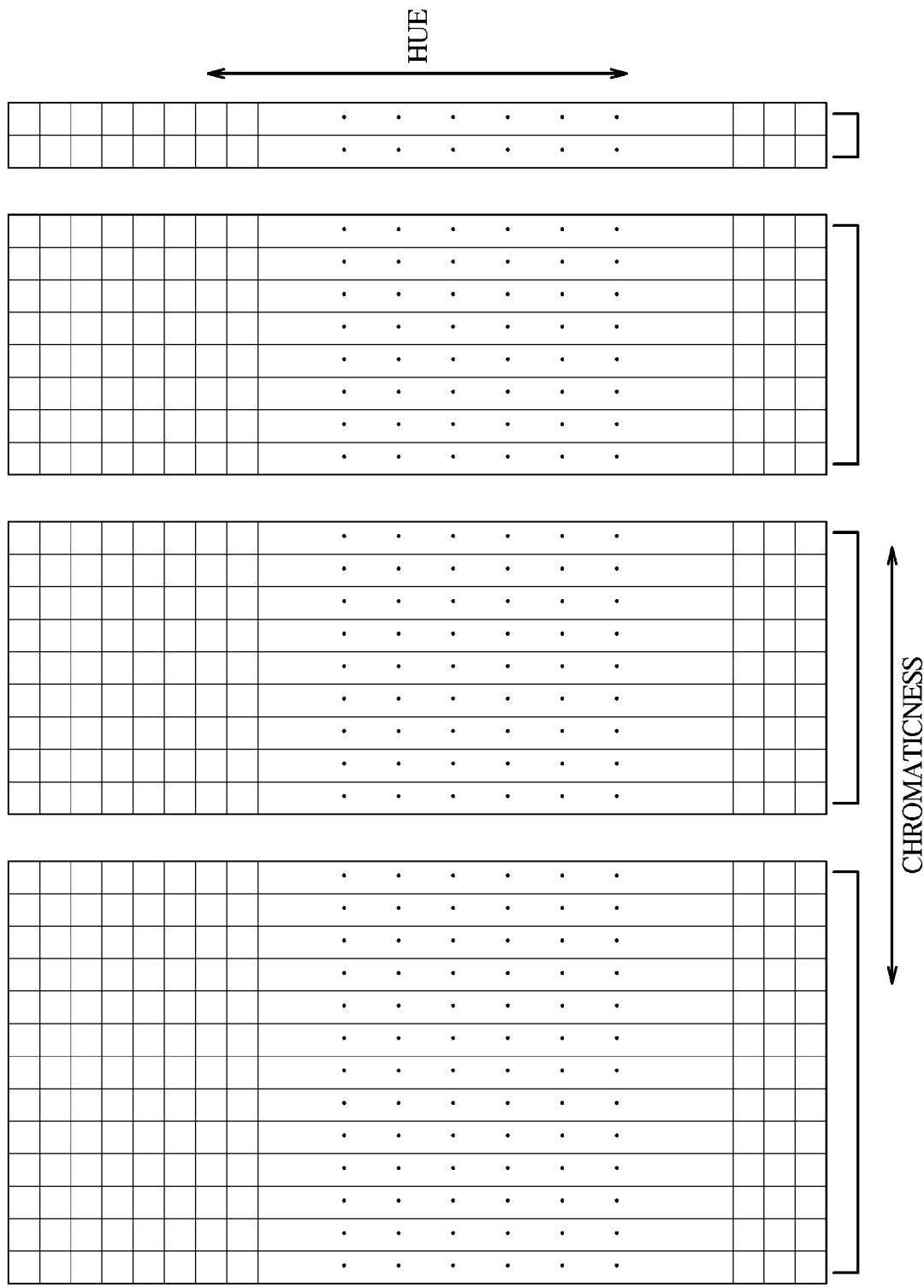
FIG. 11 is a view illustrating a color palette in which colors are arranged based on the color space of FIG. 10 according to an embodiment of the disclosure.

FIG. 11 is a view illustrating a color palette in which colors are arranged based on the color space of FIG. 10 according to an embodiment of the disclosure.

Referring to FIG. 10, the natural color system may be composed of a three-dimensional color space. A color circle may be formed based on yellow Y, red R, blue B, and green G, and a total of 40 HUEs may be arranged along the color circle.

A cross section of the color space may be expressed as a space of a triangle, which may be referred to as a color triangle. A vertical axis of the color triangle may indicate blackness and a horizontal axis may indicate chromaticness.

Referring to FIG. 11, a color palette employed by a method for recommending a color of a home appliance according to an embodiment of the disclosure may be expressed on a two-dimensional plane. The vertical axis may be composed of the aforementioned 40 HUEs, and the horizontal axis may indicate chromaticness.

For example, chromaticness may be composed of a total of four blocks, and within the same chroma block, tones may be distinguished according to brightness.

The above-described color graphic object G50 may represent colors on the color palette shown in FIG. 11. In response to selecting a color on the color palette shown in FIG. 11, the method for recommending the color of the home appliance according to an embodiment of the disclosure may determine a color scheme corresponding to the selected color, that is, a color harmonized with the selected color, based on the color scheme algorithm, and recommend the determined color.

For example, the color scheme algorithm may be generated based on Ostwald's Color Harmony Manual. The Ostwald's Color Harmony Manual may include Ostwald's harmony of isochrome series (referred to as tone on tone) and Ostwald's harmony of isovalent series (referred to as a tone in tone), and in the method for recommending the color of the home appliance according to an embodiment of the disclosure, colors may be recommended using these two harmonious theories.

As a specific example, when Ostwald's harmony of isochrome series is applied to the color palette of FIG. 11, colors belonging to the same chroma block while having different brightness among colors belonging to the same row (colors belonging to the same HUE) may be determined as colors harmonized with each other.

In addition, when Ostwald's harmony of isovalent series is applied to the color palette of FIG. 11, colors belonging to the same column, that is, colors included in other HUE having the same chromaticness and brightness, may be determined as colors harmonized with each other.

According to the color scheme algorithm used in the method for recommending the color of the home appliance according to an embodiment of the disclosure, in response to selecting one color on the color palette of FIG. 11 by the user, it is possible to recommend colors belonging to the same HUE and the same chroma block as the selected color while having a different brightness, and to recommend colors having the same chromaticness and the same brightness as the selected color and at the same time, in a similar range (e.g., included in the HUE adjacent to the selected color within 3 to 5 steps) among the colors included in another HUE.

The user may select one color on the color palette by selecting one color graphic object from among the plurality of color graphic objects G50, as illustrated in FIG. 9.

In response to selecting a color, at least one color harmonized with the selected color may be determined according to the above-described color scheme algorithm, and the color scheme graphic object G60 displayed in the first region R1 of the color recommendation user interface U2 may represent the determined at least one color.

The method for recommending the color of the home appliance according to an embodiment of the disclosure may pre-store a color scheme according to the above-described color scheme algorithm for each of a plurality of colors applicable to the home appliance. In this case, in response to selecting a color, it is possible to search a color scheme corresponding to the selected color, and provide information regarding the searched color scheme.

Alternatively, whenever a color is selected, it is also possible to obtain information on a color scheme corresponding to the selected color according to the above-described color scheme algorithm.

Figure 12:
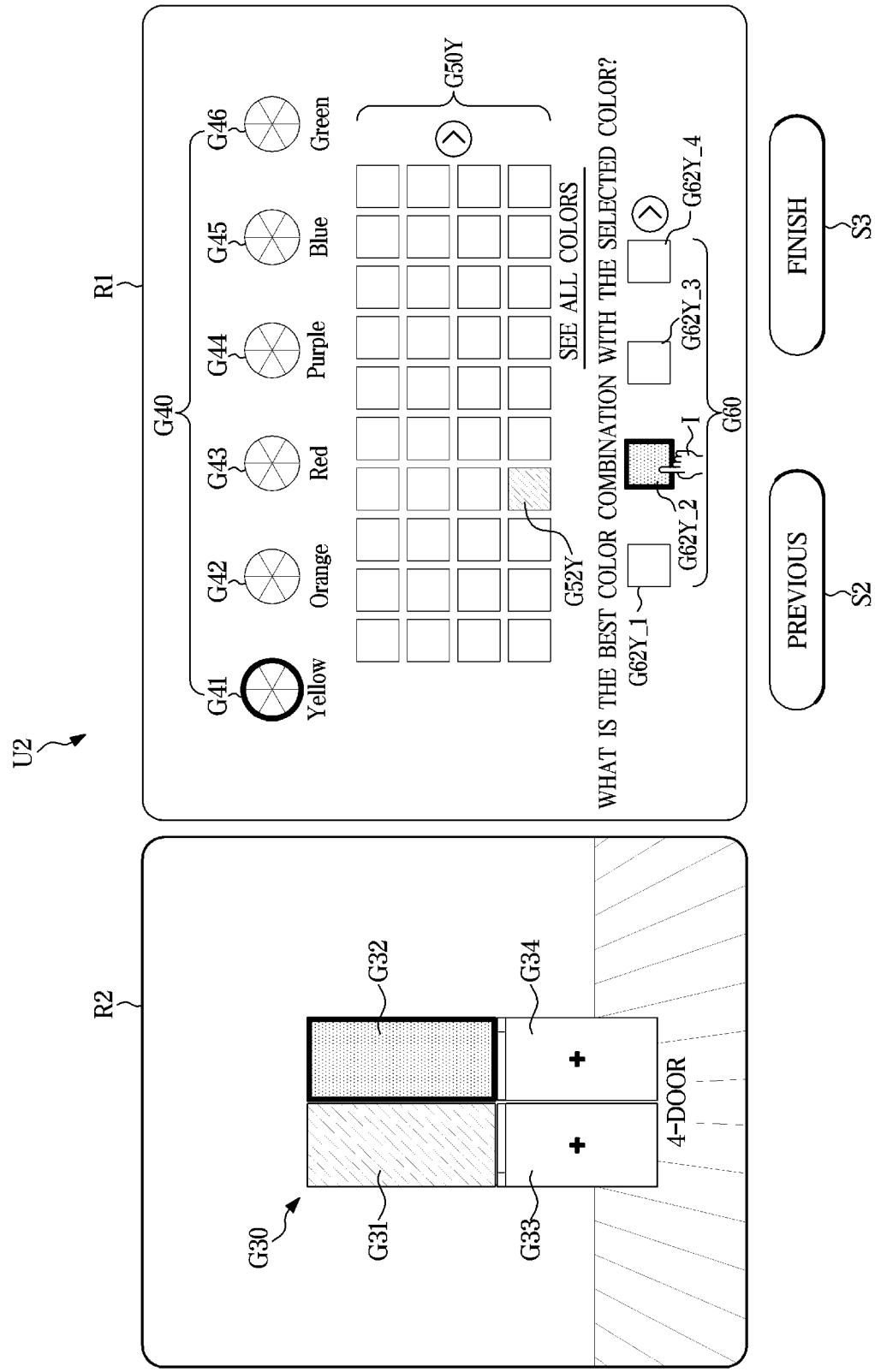
FIG. 12 is a view illustrating a user interface provided when a recommended color is selected in a method for recommending a color of a home appliance according to an embodiment of the disclosure.

FIG. 12 is a view illustrating a user interface provided when a recommended color is selected in a method for recommending a color of a home appliance according to an embodiment of the disclosure.

Figure 13:
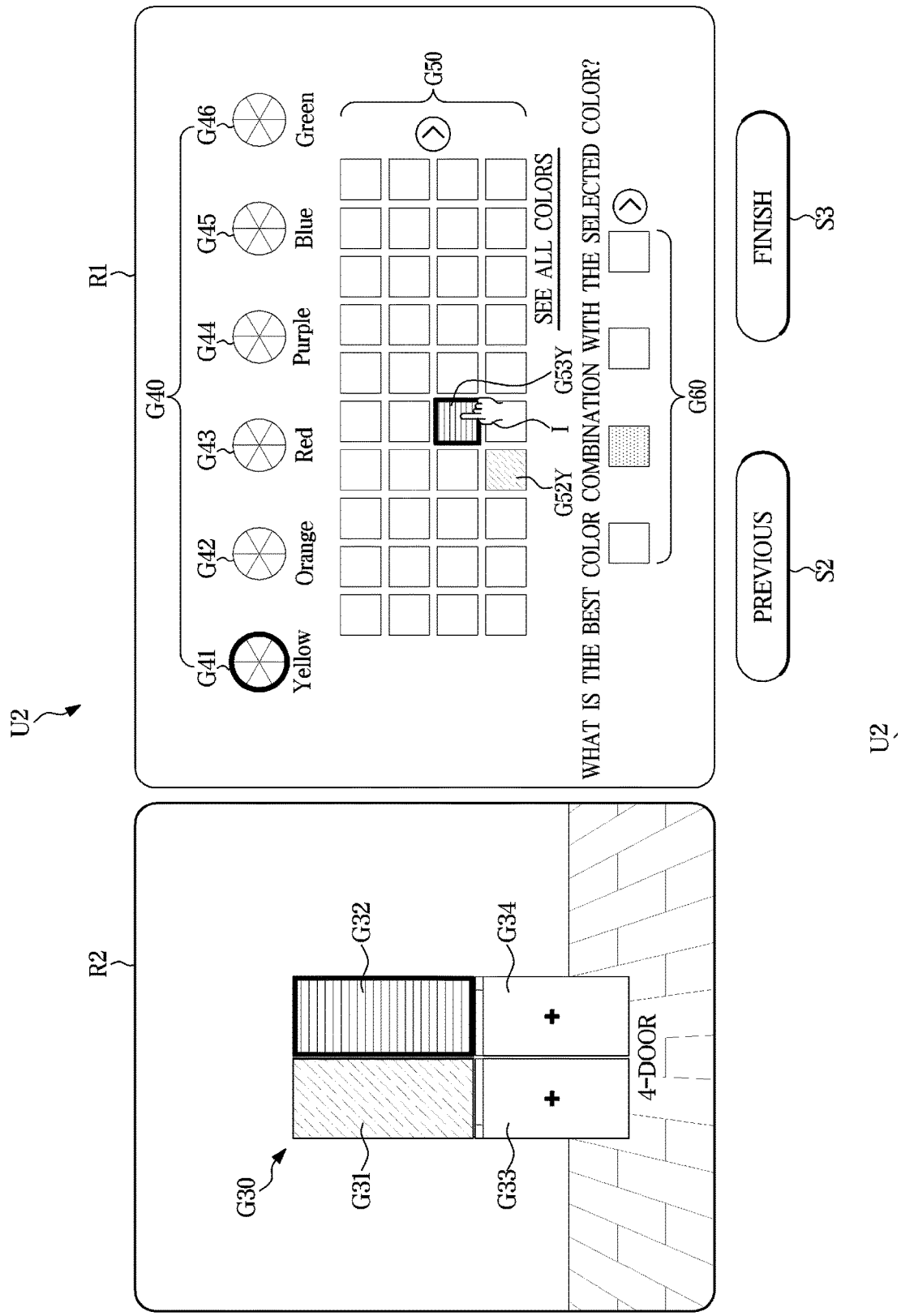
FIG. 13 is a view illustrating a user interface provided when a color that is not recommended is selected in a method for recommending the color of a home appliance according to an embodiment of the disclosure.

FIG. 13 is a view illustrating a user interface provided when a color that is not recommended is selected in a method for recommending the color of a home appliance according to an embodiment of the disclosure.

Referring to FIG. 12, for example, when there are four colors forming the color scheme, the color scheme graphic object G60 includes four color scheme graphic objects G62Y_1, G62Y_2, and G62Y_3 and G62Y_4 representing the four colors, respectively.

The user may select one of the recommended colors by selecting one G62Y_2 from among the plurality of color scheme graphic objects G60. In response to selecting the color scheme graphic object G62Y_2, by the user, a color represented by the selected color scheme graphic object G62Y_2 may be applied to the second door graphic object G32 among the plurality of door graphic objects G31, G32, G33, and G34 displayed in the second region R2.

The second door graphic object G32 may be directly selected by the user, or may be automatically selected after applying the color to the first graphic object G31.

The user can also select a color other than the recommended color.

Referring to FIG. 13, even if the color scheme graphic object G60 representing a color recommended according to the color scheme algorithm is displayed on the color recommendation user interface U2, the user does not select the color scheme graphic object G60, and select another color graphic object G53Y.

In response to selecting the other color graphic object G53Y, a color represented by the selected color graphic object G53Y may be applied to the second door graphic object G32.

Figure 14:
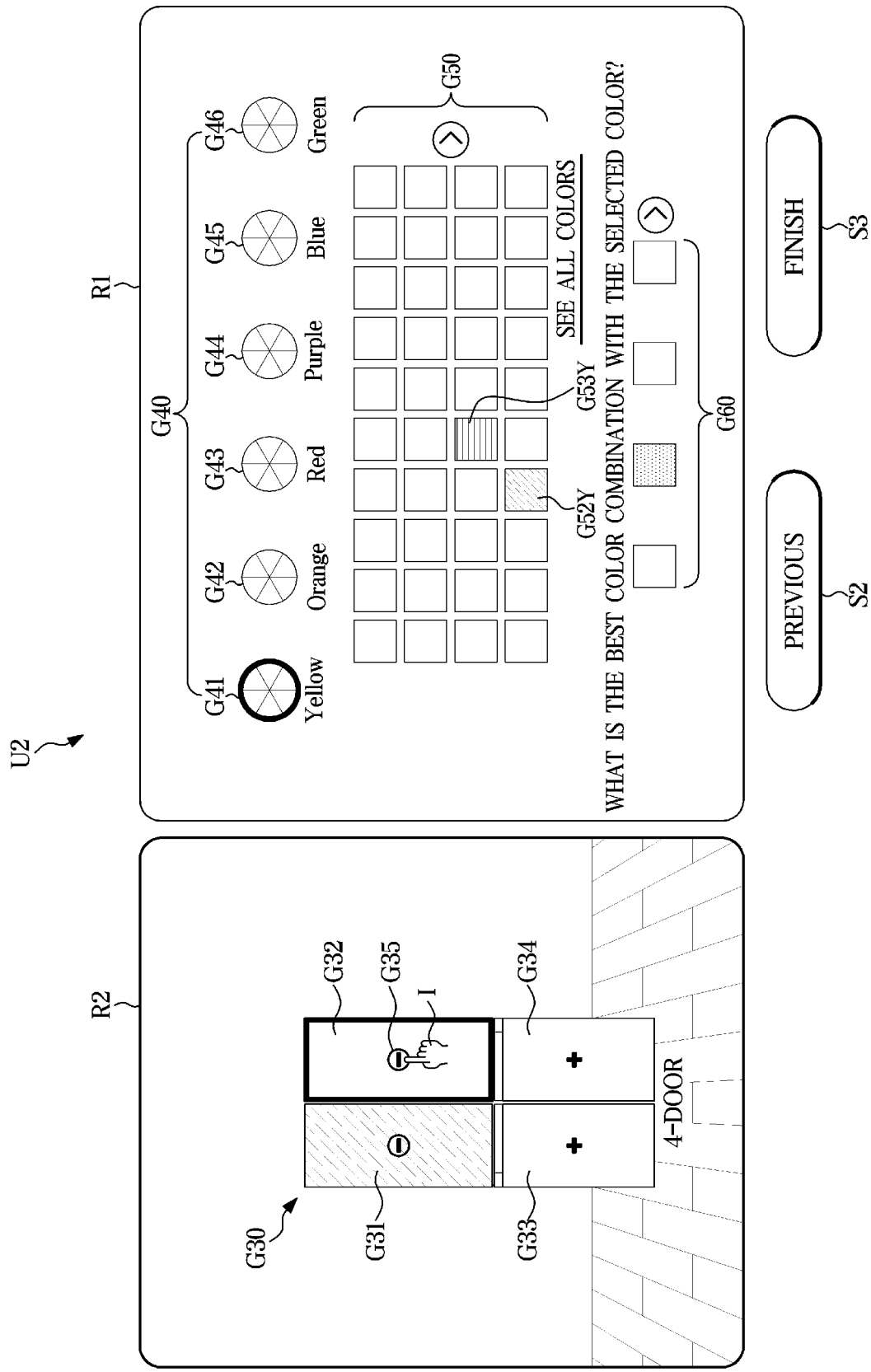
FIG. 14 is a view illustrating various examples of a user interface for providing information on a color scheme in a method for recommending a color of a home appliance according to an embodiment of the disclosure.
Figure 15:
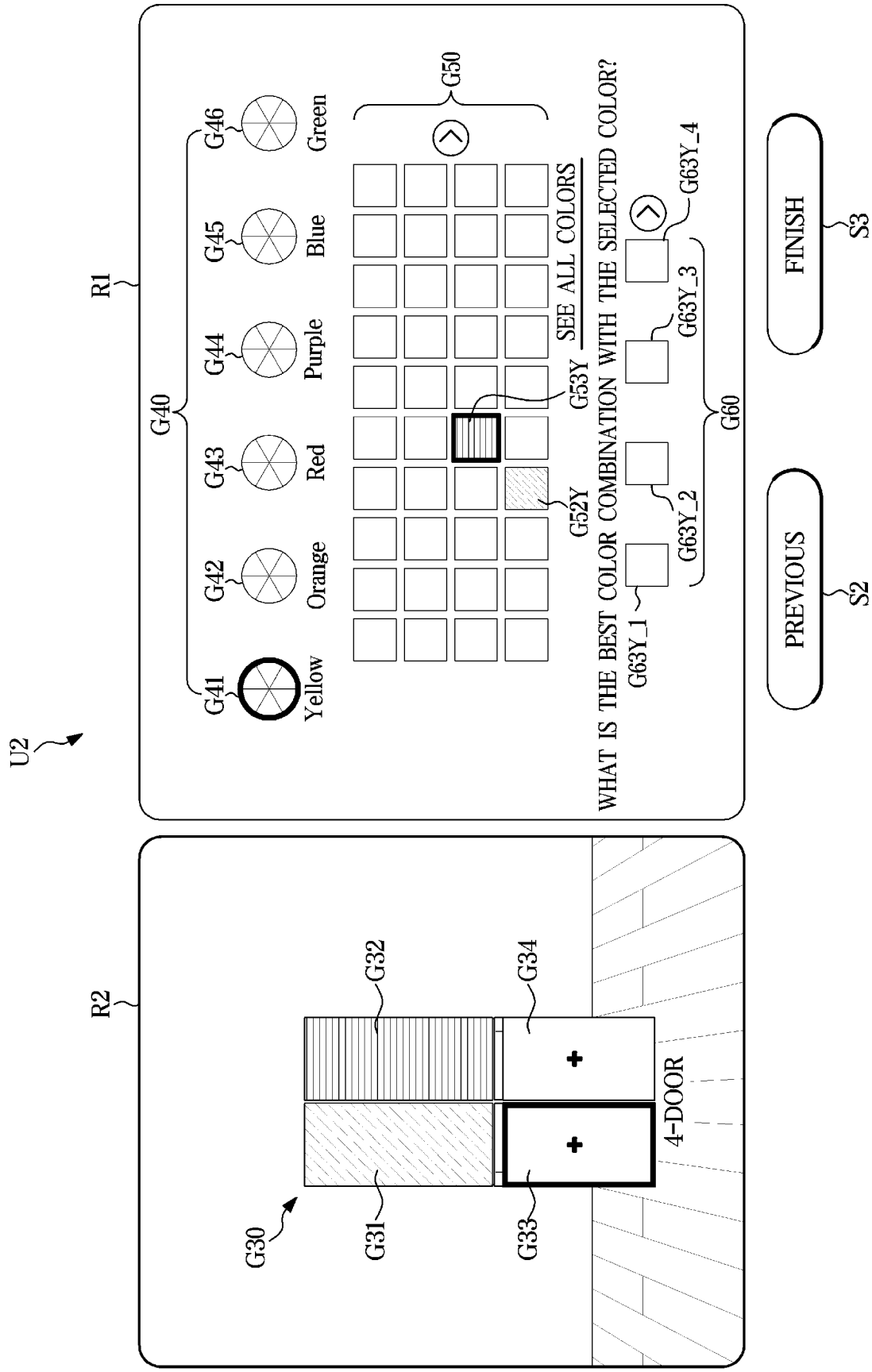
FIG. 15 is a view illustrating various examples of a user interface for providing information on a color scheme in a method for recommending a color of a home appliance according to an embodiment of the disclosure.
Figure 16:
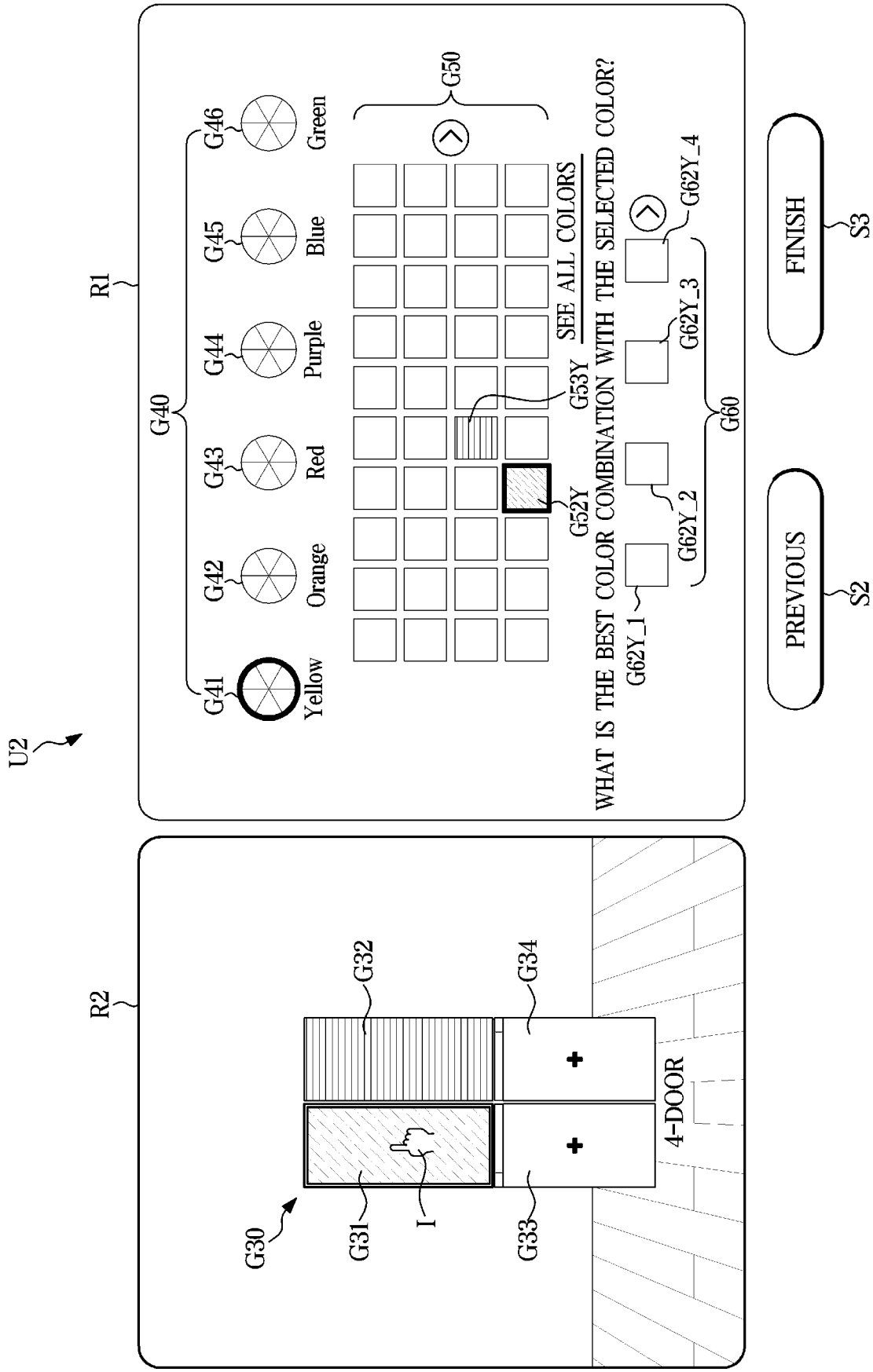
FIG. 16 is a view illustrating various examples of a user interface for providing information on a color scheme in a method for recommending a color of a home appliance according to an embodiment of the disclosure.

FIGS. 14 to 16 are views illustrating various examples of a user interface for providing information on a color scheme in a method for recommending a color of a home appliance according to various embodiments of the disclosure.

The method for recommending the color of the home appliance according to an embodiment of the disclosure, in response to a color for two or more panels among the plurality of panels being selected, may determine a color scheme that is provided to select a color of the next panel, according to various criteria.

Referring to FIG. 14, in response to selecting a color for the second door object G32 after selecting the color for the first door object G31 by the user, that is, when the last selected color is the color for the second door object G32, the color recommendation user interface U2 may provide information on a color scheme corresponding to the color selected for the second door object G32.

Particularly, in response to the color graphic object G53Y representing Blackish_037 color being selected for the second door object G32, a plurality of color scheme graphic objects G63Y_1, G63Y_2, G63Y_3, and G63Y_4 representing the color scheme corresponding to the Blackish_037 color may be displayed.

Each of the plurality of color scheme graphic objects G63Y_1, G63Y_2, G63Y_3, and G63Y_4 may respectively represent a plurality of colors determined as a color harmonious with Blackish_037 color according to the color scheme algorithm.

Alternatively, it is also possible for the user to select a door that serves as a criterion for the color scheme. Referring to FIG. 15, in response to selecting the first door graphic object G31 by the user, a color graphic object G52Y, which represents a color applied to the first door graphic object G31, among the color graphic objects G50 displayed in the first region R1 may be highlighted and displayed. In the embodiment, highlighting and displaying the graphic object may include displaying a border in bold or displaying the graphic object in dark color or blinking the graphic object. Alternatively, the graphic object may be emphasized in any way as long as it can be distinguished from other graphic objects.

In addition, the color graphic object G52Y representing the color applied to the selected first door graphic object G31 is highlighted and displayed, and at the same time, a plurality of color scheme graphic objects G62Y_1, G62Y_2, G62Y_3, and G62Y_4 representing a color scheme corresponding to the color represented by the corresponding color graphic object G52Y may be displayed.

Alternatively, in response to selecting the corresponding color graphic object G52Y by the user, the plurality of color scheme graphic objects G62Y_1, G62Y_2, G62Y_3, and G62Y_4 may be displayed.

Alternatively, it is also possible to determine a color scheme based on a color applied to a door graphic object closest to the currently selected door graphic object or a door graphic object that is a color selection target.

Referring to FIG. 16, when the currently selected door graphic object is the third door graphic object G33, a door closest to the third door graphic object G33 is the first door graphic object G31 among the door graphic objects G31 and G32, to which the color is already applied.

Accordingly, information on the color scheme corresponding to the color applied to the first door graphic object G31 may be displayed in the first region R1 of the color recommendation user interface U2. Particularly, when the color applied to the first door graphic object G31 is VIVID_077, a plurality of color scheme graphic objects G62Y_1, G62Y_2, G62Y_3, and G62Y_4 representing a color scheme corresponding to VIVID_077 color may be displayed.

Meanwhile, the method for recommending the color of the home appliance according to an embodiment of the disclosure may provide information on a color scheme differently according to at least one of a location and a size of a panel, which is a color selection target, among a plurality of panels included in the home appliance.

For example, the color scheme may be determined based on a panel having a large size or a position easily visible to the user among the plurality of panels. That is, a color harmonized with the color selected for a panel having a large size or a position easily visible to the user may be recommended for another panel.

As another example, a bright color may be recommended for an upper panel and a dark color may be recommended for a lower panel among the plurality of panels. When a color is selected for another panel and information on a color scheme corresponding to the selected color is provided, the bright color (for the upper panel) may be recommended or the dark color (for the lower panel) may be recommended from among the plurality of colors forming the color scheme.

The recommendation of the color may mean displaying a graphic object representing the recommended color.

Figure 17:
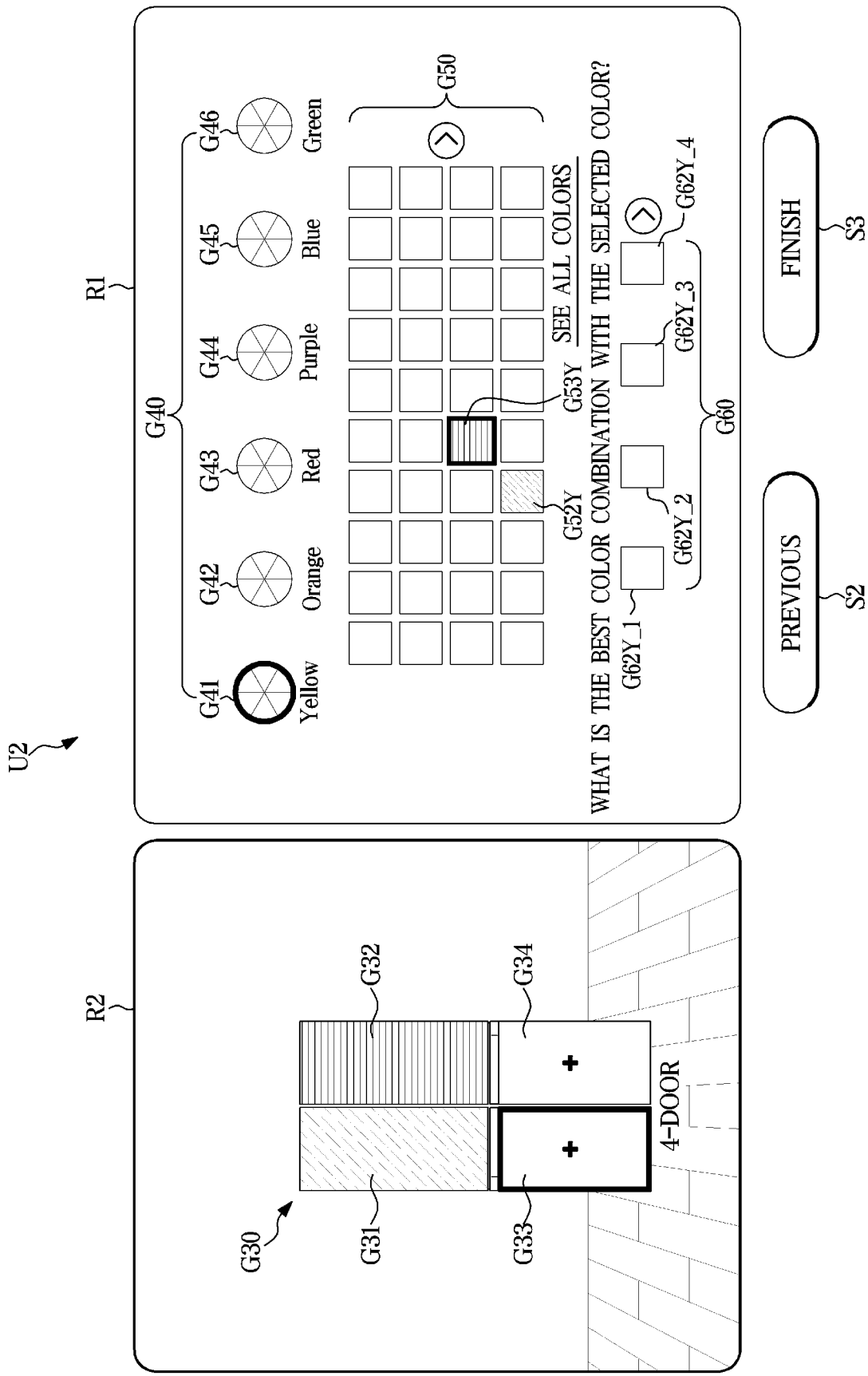
FIG. 17 is a view illustrating an example of a user interface illustrating a method of changing a color applied to a door graphic object in a method for recommending the color of a home appliance according to an embodiment of the disclosure.

FIG. 17 is a view illustrating an example of a user interface illustrating a method of changing a color applied to a door graphic object in a method for recommending the color of a home appliance according to an embodiment of the disclosure.

Referring to FIG. 17, a color cancel button G35 configured to cancel application of the color may be displayed on the door graphic objects G31 and G32 to which the selected color is applied. In response to selecting the color cancel button G35 by the user, the color of the door graphic object G32 corresponding to the selected color cancel button G35 may be deleted. That is, the color selection of the corresponding door graphic object G32 may be canceled.

Alternatively, in response to selecting another color graphic object G50 or color scheme graphic object G60 without displaying or selecting a separate color cancel button G35 in a state in which the door graphic object G32 is selected, a color applied to the door graphic object G32 may be changed.

FIGS. 18 to 22 are views illustrating an example of a user interface provided after color selection for all panels forming a home appliance is completed in the method for recommending a color of the home appliance according to various embodiments of the disclosure.

By selecting and applying the color to each of the first door object G31, the second door object G32, the third door object G33, and the fourth door object G34 according to the above-described method, the user can simulate the refrigerator to which various colors are applied, before purchasing the refrigerator.

Figure 18:
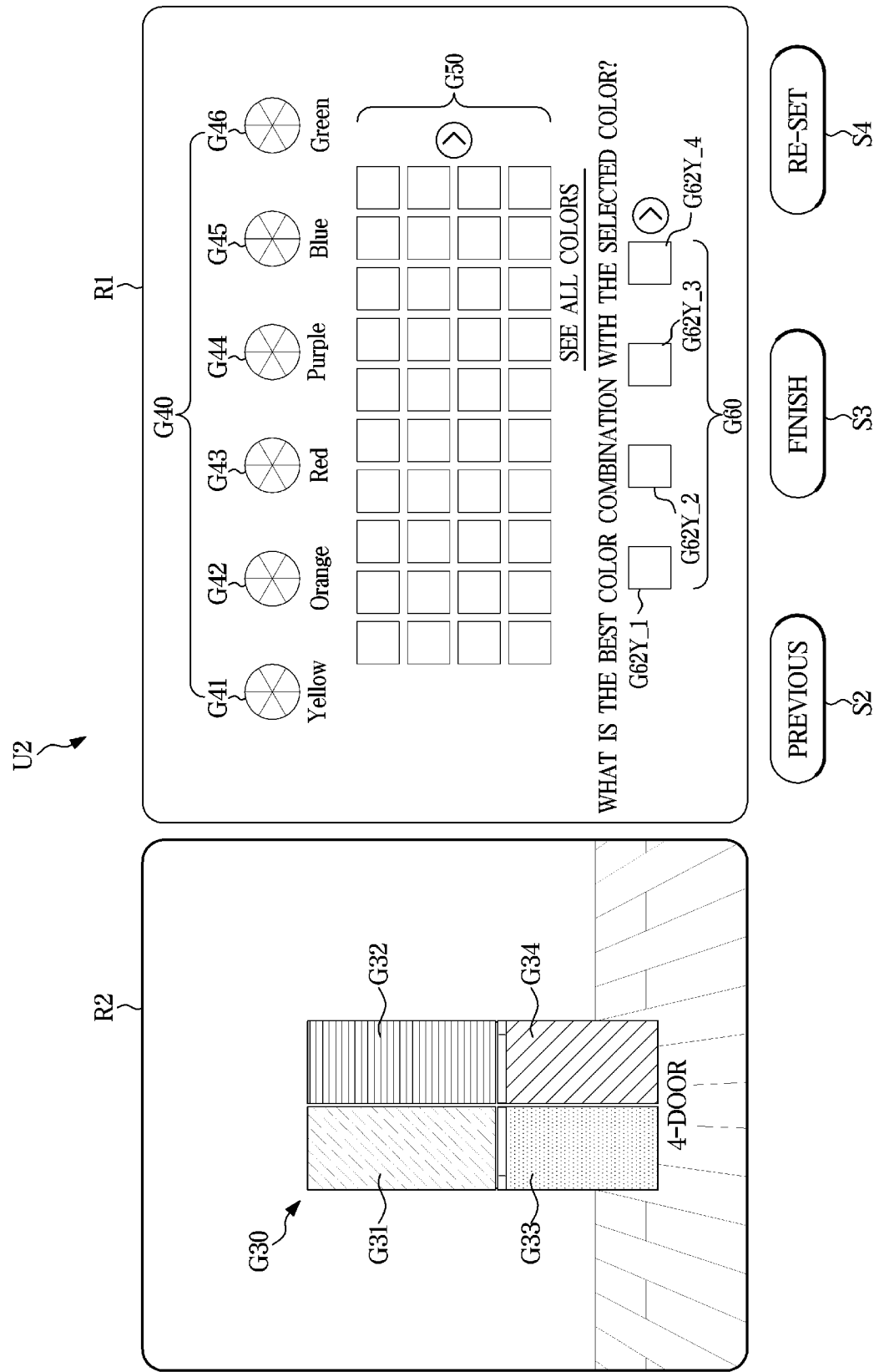
FIG. 18 is a view illustrating an example of a user interface provided after color selection for all panels forming a home appliance is completed in a method for recommending a color of the home appliance according to an embodiment of the disclosure.

Referring to FIG. 18, a previous button S2, a completion button S3, and an initialization button S4 may be displayed on the color recommendation user interface U2. In response to selecting the previous button S2 by the user, it is possible to return to a step before the color selection, that is, a step of selecting the door combination. In response to selecting the completion button S3, it is possible to move to the next step, and in response to selecting the initialization button S4, all colors applied to the simulation graphic object G30 may be deleted. That is, all color selections for the door combination may be canceled and thus it is possible to start the color selection from the beginning.

Figure 19:
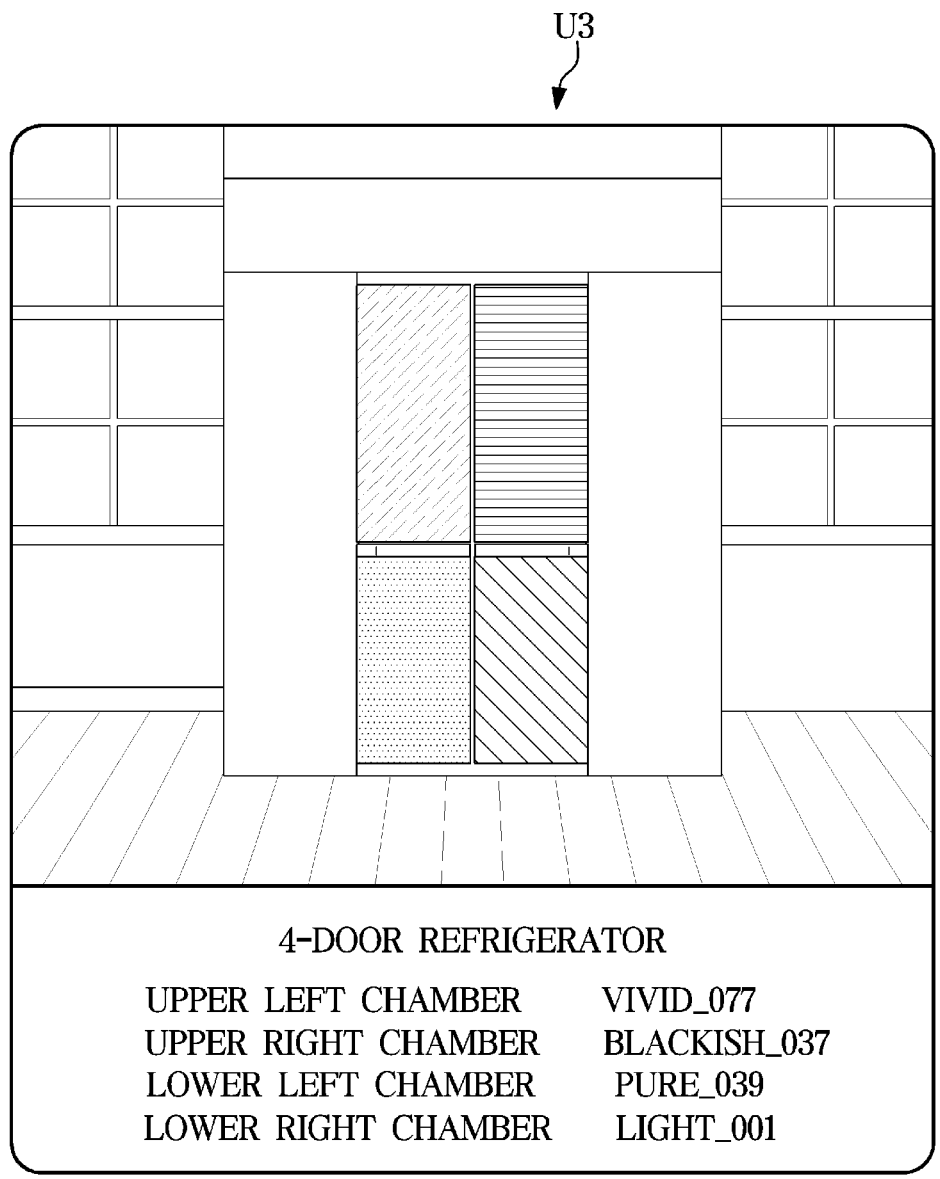
FIG. 19 is a view illustrating an example of a user interface provided after color selection for all panels forming a home appliance is completed in a method for recommending a color of the home appliance according to an embodiment of the disclosure.

Referring to FIG. 19, the method for recommending the color of the home appliance according to an embodiment of the disclosure, in response to selecting the completion button S3, may provide a confirmation user interface U3.

In the confirmation user interface U3, information on each color may be displayed together with the simulation graphic object G30 to which all the selected colors are applied.

For example, information on each color may include a color name and may be displayed as text.

An image save button S5 may be displayed on the confirmation user interface U3. In response to selecting the image save button S5 by the user, the simulation graphic object G30 displayed on the confirmation user interface U3 and information on each color may be saved as an image file. The image file may be stored in the electronic device configured to perform the method for recommending the color of the home appliance according to an embodiment of the disclosure.

The user may visit a store that sells home appliances and purchase a home appliance having a panel combination of a desired color by showing the stored image.

Figure 20:
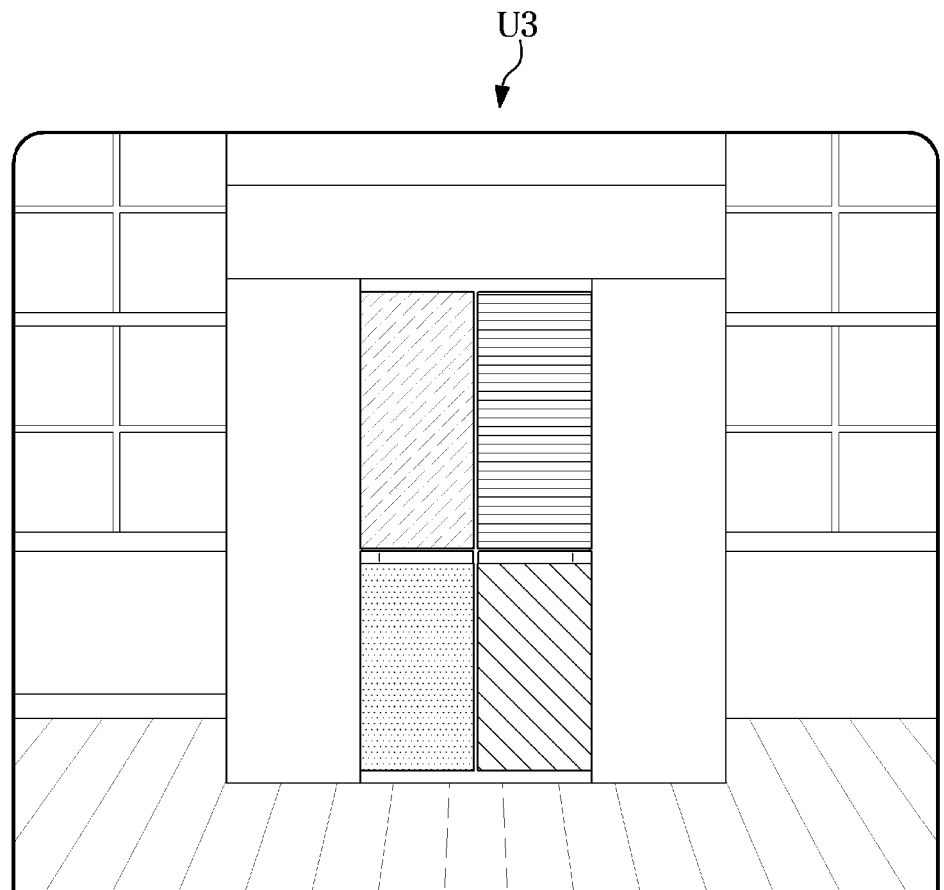
FIG. 20 is a view illustrating an example of a user interface provided after color selection for all panels forming a home appliance is completed in a method for recommending a color of the home appliance according to an embodiment of the disclosure.

Referring to FIG. 20, an image transmission button S6 may be further displayed on the confirmation user interface U3. In response to selecting the image transmission button S6 by the user, the image file, in which the simulation graphic object G30 displayed on the confirmation user interface U3 and information on each color are stored, may be transmitted to a specific target.

Figure 21:
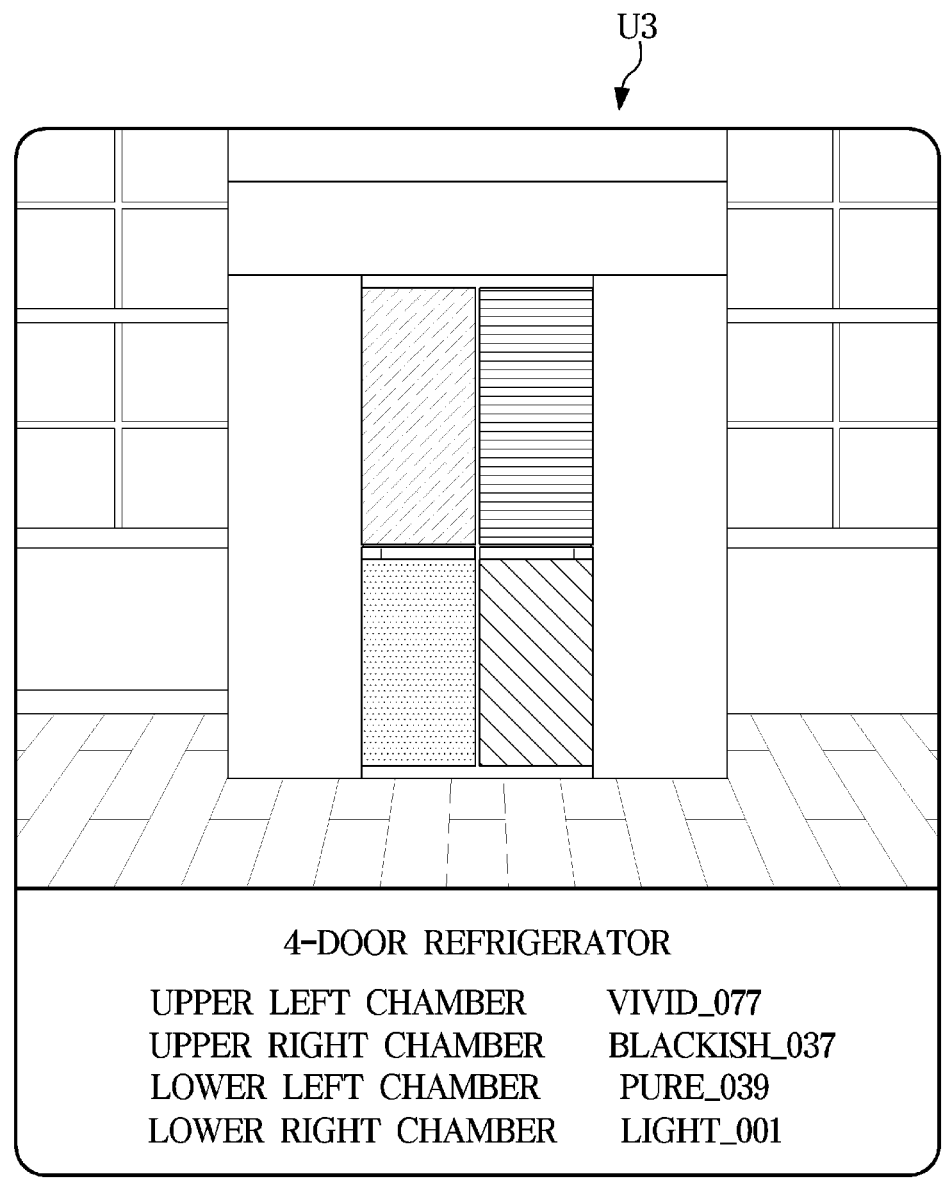
FIG. 21 is a view illustrating an example of a user interface provided after color selection for all panels forming a home appliance is completed in a method for recommending the color of the home appliance according to an embodiment of the disclosure.

Referring to FIG. 21, in response to selecting the image transmission button S6 by the user, buttons S6-1 and S6-2 provided to select a transmission target may be displayed on the confirmation user interface U3.

For example, in response to selecting the mobile phone transmission button S6-1 by the user, the image file may be transmitted to the mobile phone. When there is a pre-registered mobile phone number, the image file may be automatically transmitted to the registered mobile phone number, otherwise, a user interface provided to receive a mobile phone number may be provided.

In response to selecting the store transmission button S6-2 by the user, the image file may be transmitted to a store selling home appliances. For example, the transmission to the store may include transmission to a server operated in the store or a server providing the method for recommending the color of the home appliance according to an embodiment of the disclosure.

When there is a pre-registered store, the image file may be transmitted to the registered store, otherwise, a user interface provided to select a store may be provided.

The transmitted image file may be assigned to the user's unique ID or temporary ID, and the user may visit the store and purchase a home appliance matching the image file by presenting the unique ID or temporary ID.

Figure 22:
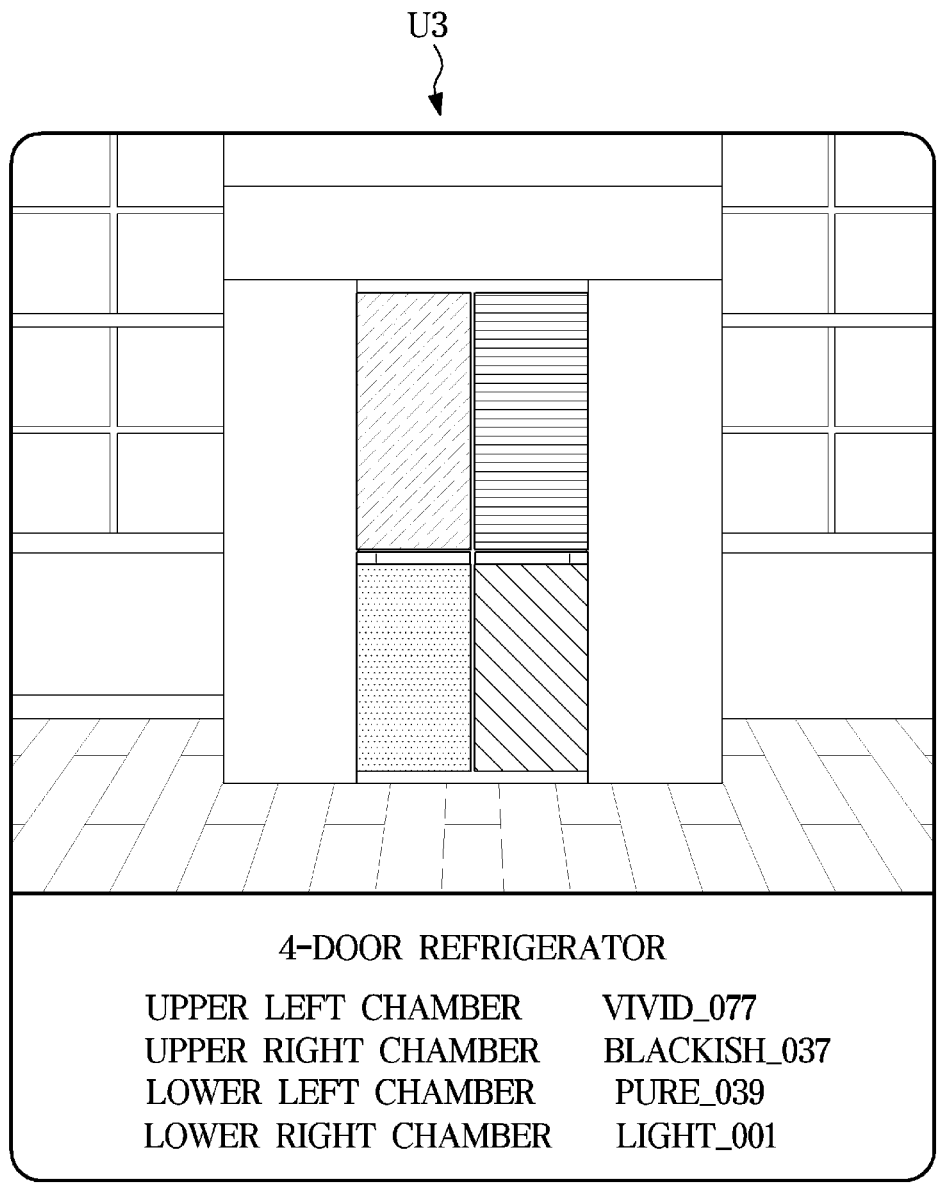
FIG. 22 is a view illustrating an example of a user interface provided after color selection for all panels forming a home appliance is completed in a method for recommending a color of a home appliance according to an embodiment of the disclosure.

Referring to FIG. 22, a purchase button S7 may be further displayed on the confirmation user interface U3. In response to selecting the purchase button S7 by the user, a process, which is for purchasing the home appliance matching the image file, that is, the home appliance having the panel combination and color selected by the user, may be executed.

Home appliances may be sold on a made-to-order basis. When order information (a panel combination and color information for each panel) for the home appliance selected by the user is transmitted to a home appliance production system, the home appliance production system may produce a panel having a color matching the order information. For example, a panel having a specific color may be produced using a digital printing method.

The method for recommending the color of the home appliance described so far may be made as a program that may be executed on a computer, and the program may be recorded on a non-transitory computer-readable recording medium. The recording medium in which the corresponding program is stored may be included in a server that provides the method for recommending the color of the home appliance, or may be included in a user's electronic device configured to perform the method for recommending the color of the home appliance.

Figure 23:
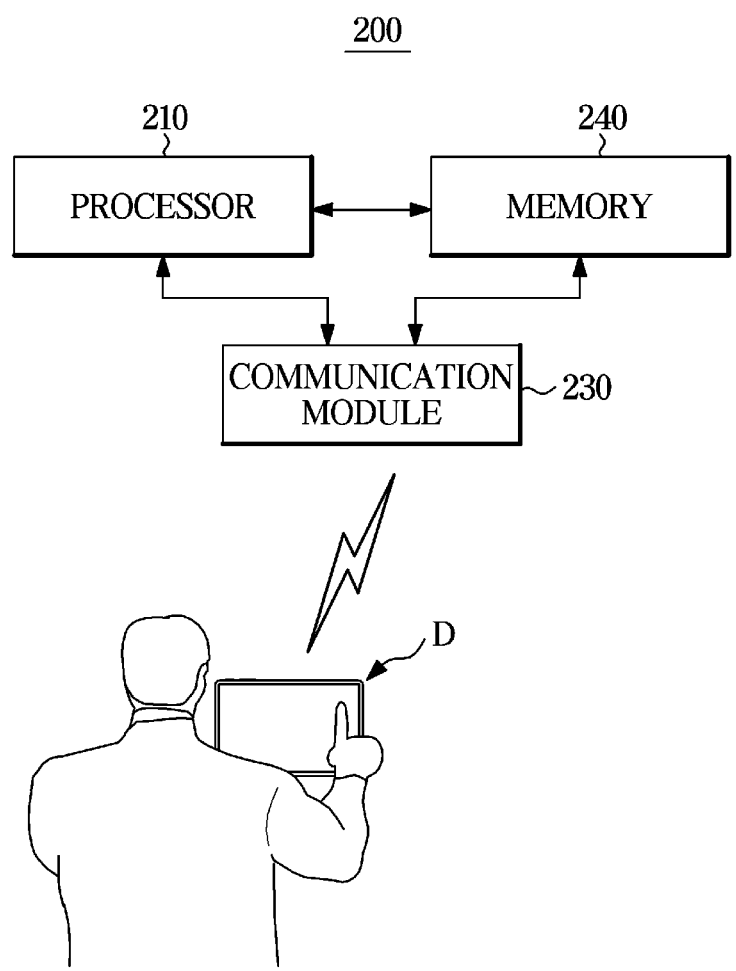
FIG. 23 is a control block diagram of a server configured to provide a method for recommending a color of a home appliance according to an embodiment of the disclosure.

FIG. 23 is a control block diagram of a server configured to provide a method for recommending a color of a home appliance according to an embodiment of the disclosure.

As an example, the above-described method for recommending the color of the home appliance may be provided by a server 200. When the user accesses a web page determined by the electronic device D, such as a computer or mobile device, various user interfaces provided by the method for recommending the color of the home appliance may be displayed on the electronic device D.

Referring to FIG. 23, the server 200 includes at least one memory 240 in which a program for performing the method for recommending the color of the home appliance described above, is stored, at least one processor 210 configured to execute the stored program, and a communication module 230 configured to exchange data with the electronic device D through a communication network.

The at least one memory 240 may include the above-described computer-readable recording medium.

Various user interfaces, which are provided by the at least one processor 210 configured to execute the program stored in the memory 240, may be transmitted to the electronic device D through the communication module 230.

The electronic device D may display the received user interface on the display, and may receive a user input for selecting the panel combination or for selecting the color through the displayed user interface. The user input received by the electronic device D may be performed as the user manipulates an input device provided in the electronic device D.

For example, the user input may be performed in such a way that the user manipulates the input device to move the indicator I to a position corresponding to a desired graphic object or button and then clicks the desired graphic object or button.

Alternatively, when the display of the electronic device D is implemented as a touch screen, the user input may be performed in such a way that the user touches a desired graphic object or button.

The electronic device D may transmit the selection of the panel combination selection or the selection of the color to the server 200, and the communication module 230 may receive the selection of the panel combination selection or the selection of the color transmitted from the electronic device D.

Figure 24:
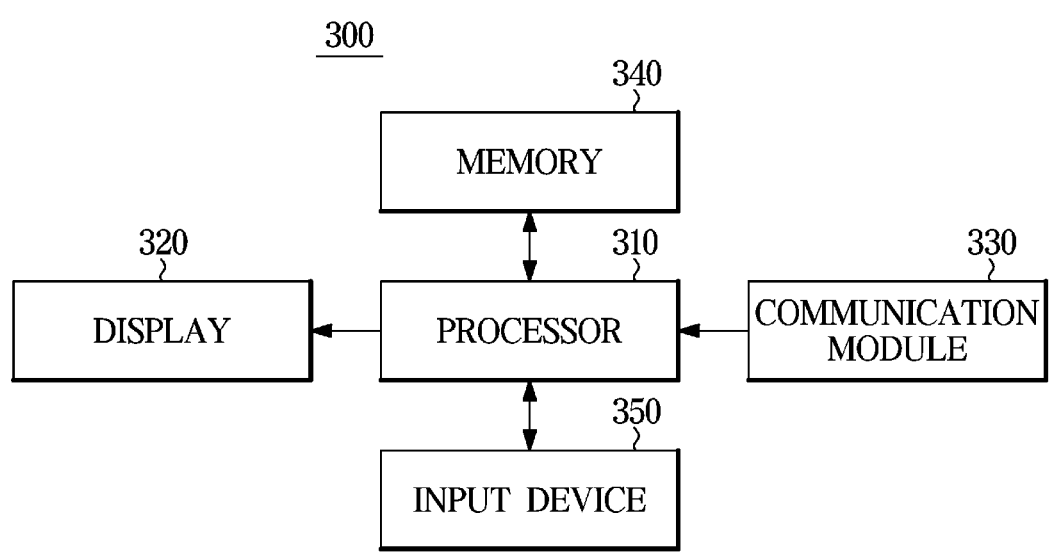
FIG. 24 is a control block diagram of an electronic device configured to provide a method for recommending a color of a home appliance according to an embodiment of the disclosure.

FIG. 24 is a control block diagram of an electronic device configured to provide the method for recommending the color of the home appliance according to an embodiment of the disclosure.

Figure 25:
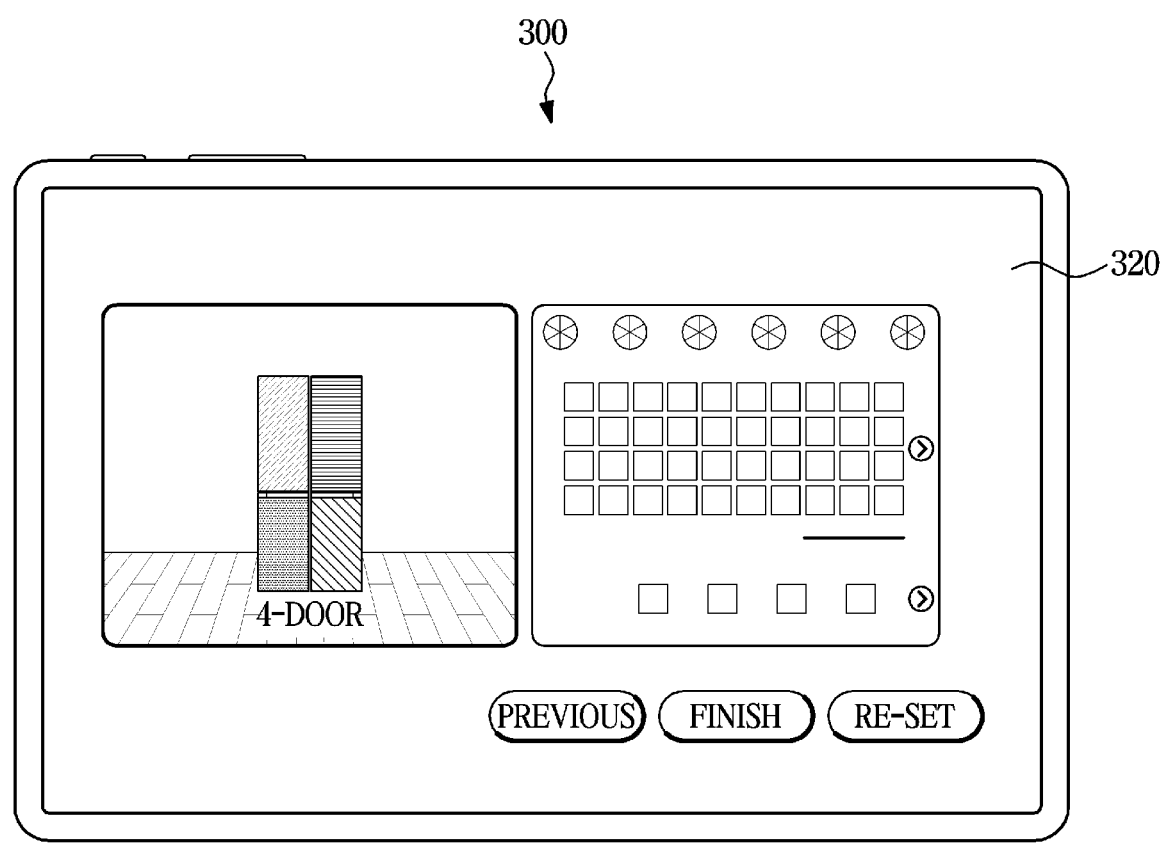
FIG. 25 is a view illustrating an example illustrating an external appearance of the electronic device of FIG. 24 according to an embodiment of the disclosure.
Figure 26:
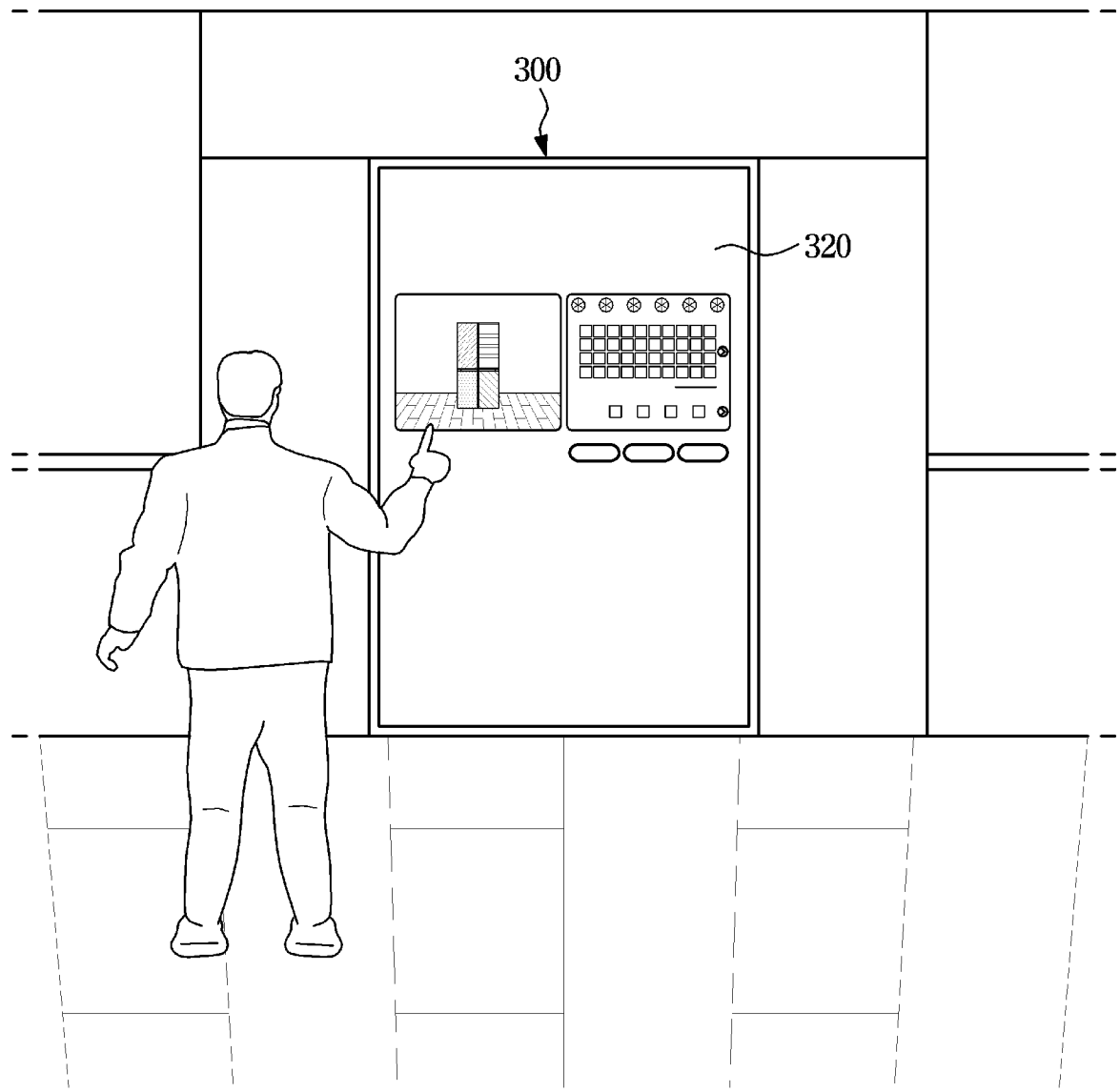
FIG. 26 is a view illustrating an example illustrating the external appearance of the electronic device of FIG. 24 according to an embodiment of the disclosure.

FIGS. 25 and 26 are an example illustrating an external appearance of the electronic device of FIG. 24 according to various embodiments of the disclosure.

As another example, the above-described method for recommending the color of the home appliance may be provided by an electronic device 300 provided in a store that sells home appliances.

Referring to FIG. 24, the electronic device 300 includes at least one memory 340 in which a program for performing the above-described method for recommending the color of the home appliance is stored, at least one processor 310 configured to execute the stored program, and a display 320 configured to display a user interface provided as the stored program is executed, and an input device 350 configured to receive a user input for selecting a panel combination or color.

The at least one memory 340 may include the above-described computer-readable recording medium.

The electronic device 300 may be a mobile device such as a tablet personal computer (PC) as shown in FIG. 25, or a display device such as a kiosk or digital signage as shown in FIG. 26.

Referring to FIGS. 25 and 26, various user interfaces U1, U2, and U3 provided by the above-described method for recommending the color of the home appliance may be displayed on the display 320, and the input device 350 may receive the user input performed through the displayed user interfaces U1, U2, and U3. The input device 350 may be an input device that requires manual manipulation, such as a keyboard, a button, a jog shuttle, or a mouse, or may be a touch pad that implements a touch screen together with the display 320.

On the other hand, in a state in which the electronic device 300 is implemented as a display device as shown in FIG. 26, after the selection of the color for the panel combination is completed, a temporary code may be assigned to information on the selected color, and the temporary code may be printed on paper. The user can purchase a home appliance having the selected color by presenting the print to a seller in the store.

Figure 27:
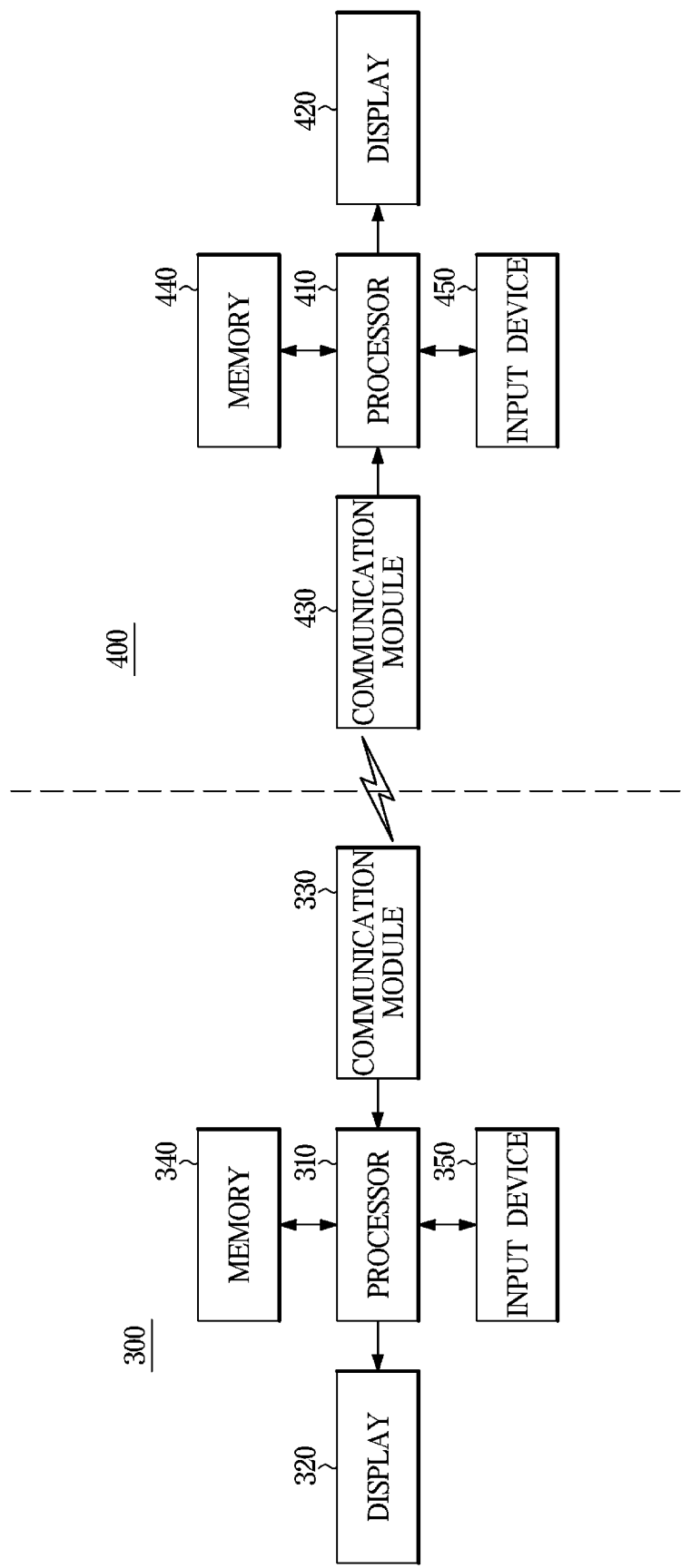
FIG. 27 is a control block diagram illustrating a case in which a plurality of electronic devices is used to provide a method for recommending a color of a home appliance according to an embodiment of the disclosure.

FIG. 27 is a control block diagram illustrating a case in which a plurality of electronic devices is used to provide a method for recommending a color of a home appliance according to an embodiment of the disclosure.

Figure 28:
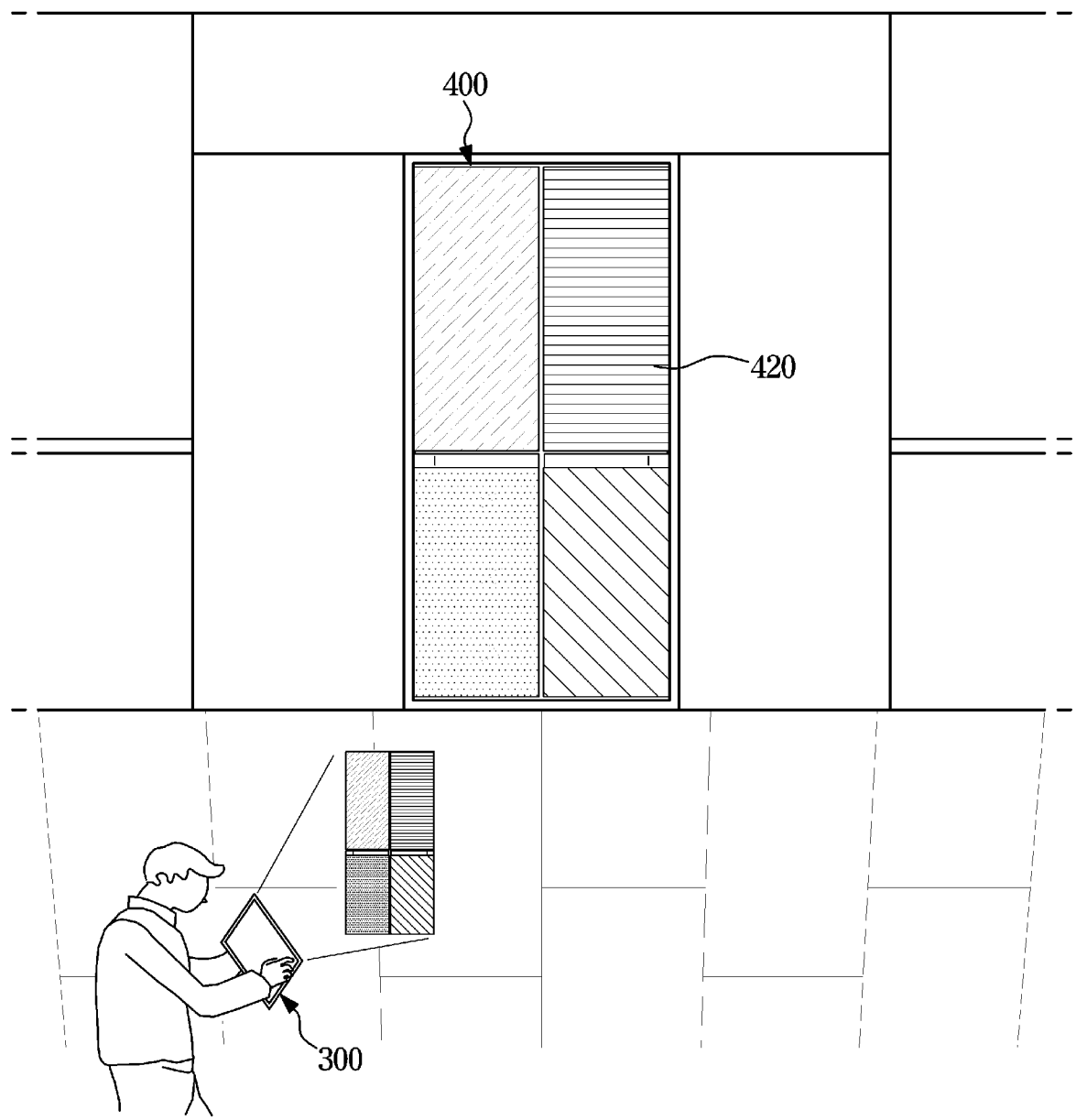
FIG. 28 is a view illustrating a role of each electronic device when a plurality of electronic devices is used to provide a method for recommending a color of a home appliance according to an embodiment of the disclosure.

FIG. 28 is a view illustrating a role of each electronic device when a plurality of electronic devices is used to provide a method for recommending a color of a home appliance according to an embodiment of the disclosure.

Referring to FIG. 27, as described above, the first electronic device 300 may display the various user interfaces U1, U2, and U3 used for the user to select the panel combination or a color, and receive a user input.

The communication module 330 may communicate with a second electronic device 400 to transmit/receive data.

Particularly, the first electronic device 300 may transmit a signal corresponding to a user selection of the panel combination or the color to the second electronic device 400.

A communication module 430 of the second electronic device 400 may receive a signal corresponding to the user selection transmitted from the first electronic device 300. A display 420 of the second electronic device 400 may display a simulation graphic object G30 based on a signal corresponding to the user selection.

That is, the simulation graphic object G30 displayed on the display 420 of the second electronic device 400 may be a graphic object to which a user-selected panel combination and a user-selected color are applied.

Referring to FIG. 28, together, the display 420 of the second electronic device 400 may have a size similar to or greater than an actual size of the home appliance. Therefore, the display 420 may display the simulated graphic object G30 in a size similar to the actual size of the home appliance, and the user can obtain the same effect as checking the actual home appliance having the panel combination and color selected by the user. The electronic device 400 may also include a processor 410, a memory 440 and an input device 450.

As is apparent from the above description, a consumer can intuitively and conveniently select a color applied to a panel of a home appliance.

Further, it is possible to guide a user's color selection by recommending colors that are harmonized with each other for each of a plurality of panels included in a home appliance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for recommending a color of a home appliance comprising:
   providing a plurality of panel graphic objects corresponding to each of a plurality of panels of the home appliance;
   providing a plurality of color graphic objects each representing a plurality of colors;
   receiving a selection for one of the plurality of color graphic objects for a first panel of the plurality of panels of the home appliance;
   applying a color represented by the selected color graphic object to one of the plurality of panel graphic objects; and
   providing information on a color scheme corresponding to the color represented by the selected color graphic object for the first panel of the plurality of panels of the home appliance for selection of color for each of the other panels of the plurality of panels of the home appliance.

2. The method for recommending the color of the home appliance of claim 1, further comprising:
   pre-storing a color scheme corresponding to each of the plurality of colors.

3. The method for recommending the color of the home appliance of claim 1, wherein the providing of the information on the color scheme comprises obtaining the color scheme corresponding to the color represented by the selected color graphic object, according to a predetermined color scheme algorithm.

4. The method for recommending the color of the home appliance of claim 1, further comprising:
   providing a plurality of color group graphic objects each representing a plurality of color groups; and
   receiving a selection for one of the plurality of color group graphic objects,
   wherein the plurality of color graphic objects each represents a plurality of colors included in the selected color group graphic objects.

5. The method for recommending the color of the home appliance of claim 4, wherein the providing of the information on the color scheme comprises providing a plurality of color scheme graphic objects each representing a plurality of colors forming the color scheme.

6. The method for recommending the color of the home appliance of claim 5, wherein the plurality of panel graphic objects and the plurality of color graphic objects are provided on a single screen.

7. The method for recommending the color of the home appliance of claim 6, wherein the plurality of color group graphic objects, the plurality of color graphic objects, and the plurality of color scheme graphic objects are displayed in order along one direction.

8. The method for recommending the color of the home appliance of claim 1, wherein the providing of the information on the color scheme comprises, in response to a color being respectively applied to two or more panel graphic objects among the plurality of panel graphic objects, providing information on a color scheme corresponding to the last applied color among the applied colors.

9. The method for recommending the color of the home appliance of claim 1, wherein the providing of the information on the color scheme comprises, in response to a color being respectively applied to two or more panel graphic objects among the plurality of panel graphic objects, providing information on a color scheme corresponding to a color, which is applied to a panel graphic object closest to a panel graphic object which is a color selection target, among the applied colors.

10. The method for recommending the color of the home appliance of claim 1, wherein the providing of the information on the color scheme comprises providing information on the color scheme differently according to at least one of a location and a size of a panel, which is a color selection target, among the plurality of panels.

11. The method for recommending the color of the home appliance of claim 1, further comprising: in response to completion of selection of a color for each of the plurality of panels, storing information on the color selected for each of the plurality of panels in an electronic device or a server.

12. The method for recommending the color of the home appliance of claim 1, further comprising: in response to completion of selection of a color for each of the plurality of panels, providing a user interface for purchasing a home appliance comprising a plurality of panels of the selected color.

13. A non-transitory computer-readable recording medium comprising:
- a program including instructions configured to perform a method for recommending a color of a home appliance,
- wherein execution of the instructions by at least one processor performs the method for the recommending of the color of the home appliance, comprising:
    - providing a plurality of panel graphic objects corresponding to each of a plurality of panels of the home appliance,
    - providing a plurality of color graphic objects representing a plurality of colors, respectively,
    - receiving a selection for one of the plurality of color graphic objects for a first panel of the plurality of panels of the home appliance,
    - applying a color represented by the selected color graphic object to one of the plurality of panel graphic objects, and
    - providing information on a color scheme corresponding to the color represented by the selected color graphic object for the first panel of the plurality of panels of the home appliance for selection of color for each of the other panels of the plurality of panels of the home appliance.

14. The non-transitory computer-readable recording medium of claim 13, wherein the method for recommending the color of the home appliance further comprises prestoring a color scheme corresponding to each of the plurality of colors.

15. The non-transitory computer-readable recording medium of claim 13, wherein the providing of the information on the color scheme comprises obtaining the color scheme corresponding to the color represented by the selected color graphic object according to a predetermined color scheme algorithm.

16. The non-transitory computer-readable recording medium of claim 15, further comprising a user interface, wherein the user interface displays of the plurality of colors as a natural color system may be composed of a three-dimensional color space.

17. The non-transitory computer-readable recording medium of claim 16, wherein the user interface further displays a color circle formed based on yellow Y, red R, blue B and green G, and a total of 40 hues arranged along the color circle.

18. The non-transitory computer-readable recording medium of claim 17, wherein the color scheme algorithm comprises:
- in response to selecting one color of the plurality of colors, recommending colors belonging to a same hue and a same chroma block as the selected one color while having a different brightness and recommending colors having a same chromaticness and the same brightness as the selected one color.

\* \* \* \* \*